US012568096B2

(12) United States Patent
Paul et al.

(10) Patent No.:  US 12,568,096 B2
(45) Date of Patent:      Mar. 3, 2026

(54) SYSTEMS AND METHODS FOR STRUCTURAL SIMILARITY BASED HASHING

(71) Applicant: Zscaler, Inc., San Jose, CA (US)

(72) Inventors: Sandeep Paul, Bangalore (IN); Deepen Desai, San Ramon, CA (US)

(73) Assignee: Zscaler, Inc., San Jose, CA (US)

( * ) Notice:     Subject to any disclaimer, the term of this patent is extended or adjusted under 35 U.S.C. 154(b) by 73 days.

(21) Appl. No.: 18/582,898

(22) Filed:       Feb. 21, 2024

(65)               Prior Publication Data

US 2025/0227116 A1       Jul. 10, 2025

(30)          Foreign Application Priority Data

Jan. 9, 2024     (IN) .............................. 202441001556

(51) Int. Cl.
      *H04L 9/40*                  (2022.01)
(52) U.S. Cl.
      CPC ...... *H04L 63/1416* (2013.01); *H04L 63/1425* (2013.01); *H04L 63/145* (2013.01)
(58) Field of Classification Search
      CPC .............. H04L 9/0643; H04L 63/1416; H04L 63/1425; H04L 63/145
      USPC .................................................... 726/11, 22
      See application file for complete search history.

(56)                 References Cited

U.S. PATENT DOCUMENTS

| | | | |
|---|---|---|---|
| 8,180,916 B1 * | 5/2012 | Nucci ................... | H04L 43/028 709/224 |
| 10,142,362 B2 | 11/2018 | Weith et al. | |

| | | | |
|---|---|---|---|
| 10,419,477 B2 | 9/2019 | Desai et al. | |
| 10,904,274 B2 | 1/2021 | Weith et al. | |
| 11,627,148 B2 | 4/2023 | Desai | |
| 11,799,876 B2 | 10/2023 | Desai et al. | |
| 2007/0195779 A1 * | 8/2007 | Judge ................... | H04L 51/212 370/235 |
| 2008/0256230 A1 * | 10/2008 | Handley .............. | H04L 63/145 709/224 |
| 2010/0042846 A1 * | 2/2010 | Trotter ................. | H04L 63/104 235/375 |
| 2017/0359220 A1 | 12/2017 | Weith et al. | |
| 2019/0171665 A1 * | 6/2019 | Navlakha ............. | G06V 10/761 |
| 2021/0192043 A1 | 6/2021 | Bhary et al. | |
| 2021/0344693 A1 | 11/2021 | Azad et al. | |
| 2021/0374121 A1 * | 12/2021 | Paul ...................... | H04L 9/0894 |
| 2021/0377301 A1 | 12/2021 | Desai et al. | |

(Continued)

OTHER PUBLICATIONS

Sadowski, Caitlin, and Greg Levin. "Simhash: Hash-based similarity detection." Dec. 13, 2007 (Year: 2007).*

(Continued)

*Primary Examiner* — Syed A Zaidi

(74) *Attorney, Agent, or Firm* — Baratta Law PLLC; Lawrence A. Baratta, Jr.; Ryan Odessa

(57)                    ABSTRACT

Systems and methods for structural similarity based hash for sample identification and detection include, monitoring traffic associated with a cloud-based system; identifying a unique file within the traffic and computing a Structural Similarity Hash (SSHash) for the file, wherein the SSHash is based on auxiliary information and a complexity of the file; identifying one or more similar files based on the SSHash; and defining the file as belonging to one or more groups based on the one or more similar files.

20 Claims, 20 Drawing Sheets

(56)            References Cited

U.S. PATENT DOCUMENTS

| | | |
|---|---|---|
| 2021/0377303 A1 | 12/2021 | Bui et al. |
| 2021/0377304 A1 | 12/2021 | Ma et al. |
| 2022/0083661 A1 | 3/2022 | Ma et al. |
| 2022/0253430 A1* | 8/2022 | Paul .................... G06F 16/2255 |
| 2023/0164182 A1 | 5/2023 | Kothari et al. |
| 2023/0164183 A1 | 5/2023 | Kothari et al. |
| 2023/0164184 A1 | 5/2023 | Kothari et al. |
| 2023/0353587 A1 | 11/2023 | Bui et al. |
| 2023/0370495 A1 | 11/2023 | Zscaler |
| 2023/0376592 A1 | 11/2023 | Ma et al. |
| 2024/0028707 A1 | 1/2024 | Paul et al. |
| 2024/0028721 A1 | 1/2024 | Ma et al. |
| 2024/0039954 A1 | 2/2024 | Shete et al. |

OTHER PUBLICATIONS

NPL Search Terms (Year: 2025).*

Namanya, Anitta Patience, et al. "Similarity hash based scoring of portable executable files for efficient malware detection in IoT." Future Generation Computer Systems 110 (2020): 824-832. (Year: 2020).*

Georg Wicherski, peHash: a novel approach to fast malware clustering, in: LEET'09 Proceedings of the 2nd USENIX Conference on Large-Scale Exploits and Emergent Threats: Botnets, Spyware, Worms, and More, 2009 (Year: 2009).*

* cited by examiner

650

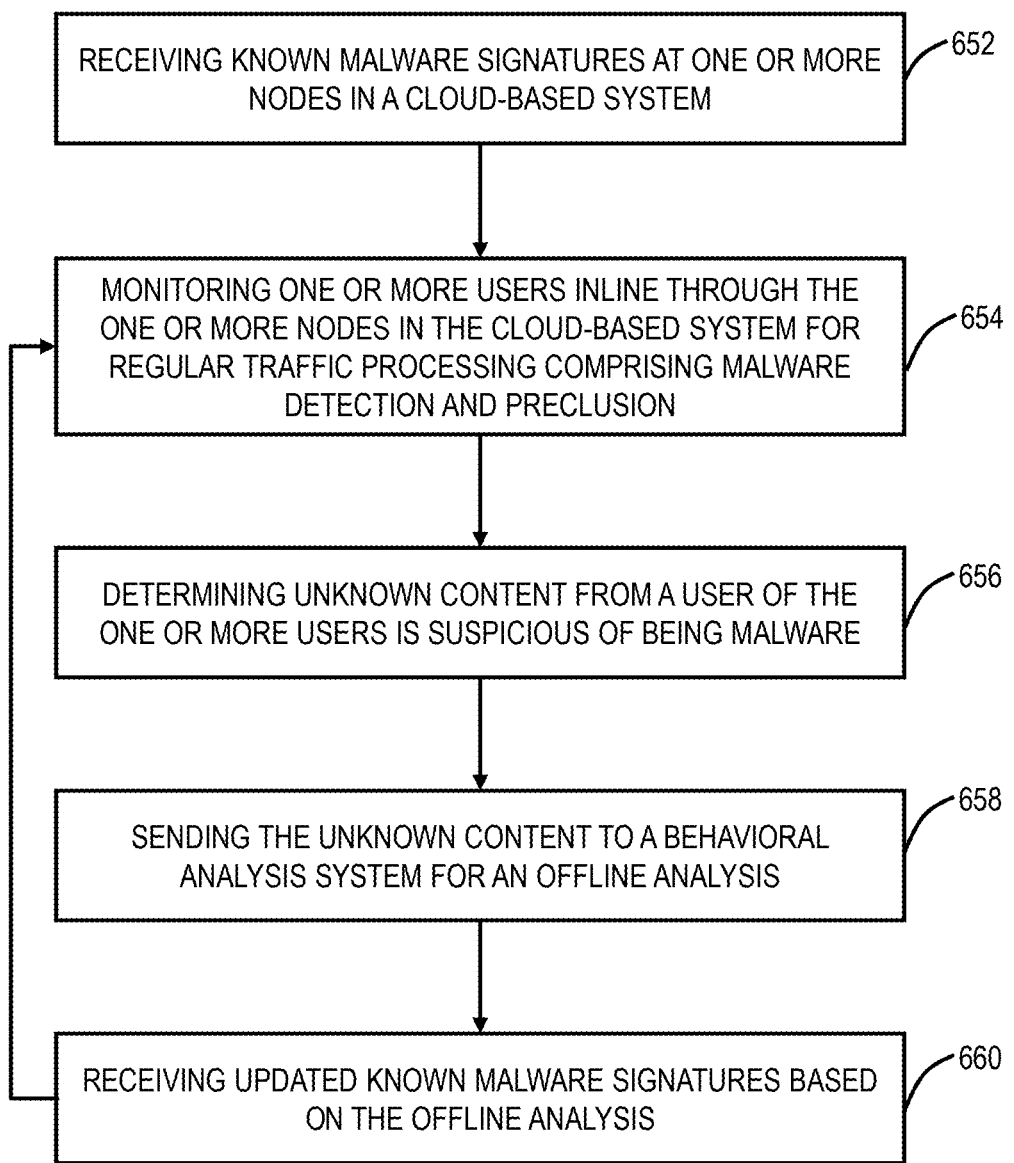

RECEIVING KNOWN MALWARE SIGNATURES AT ONE OR MORE NODES IN A CLOUD-BASED SYSTEM ⟋652

MONITORING ONE OR MORE USERS INLINE THROUGH THE ONE OR MORE NODES IN THE CLOUD-BASED SYSTEM FOR REGULAR TRAFFIC PROCESSING COMPRISING MALWARE DETECTION AND PRECLUSION ⟋654

DETERMINING UNKNOWN CONTENT FROM A USER OF THE ONE OR MORE USERS IS SUSPICIOUS OF BEING MALWARE ⟋656

SENDING THE UNKNOWN CONTENT TO A BEHAVIORAL ANALYSIS SYSTEM FOR AN OFFLINE ANALYSIS ⟋658

RECEIVING UPDATED KNOWN MALWARE SIGNATURES BASED ON THE OFFLINE ANALYSIS ⟋660

FIG. 4

DYNAMIC YARA HITS

Win32_Banker_Trickbot_119723 { mutantcreated:name\Sessions\1\BaseNamedObjects\Global\789C0000010 || filedump:path:C:\Users\user\AppData\Roaming\ || processcreated:cmdline:C\Windows]system32\svchost.exe

950

1100

RECEIVING UNKNOWN CONTENT IN A CLOUD-BASED SANDBOX ⟋1102

PERFORMING AN ANALYSIS OF THE UNKNOWN CONTENT IN THE CLOUD-BASED SANDBOX ⟋1104

OBTAINING EVENTS BASED ON THE ANALYSIS ⟋1106

RUNNING ONE OR MORE EXPLOIT DETECTION RULES ON THE EVENTS ⟋1108

PROVIDING A SCORE BASED ON A RESULT OF THE ONE OR MORE RULES ⟋1110

_1200_
STUB/PACKED FILE

1400

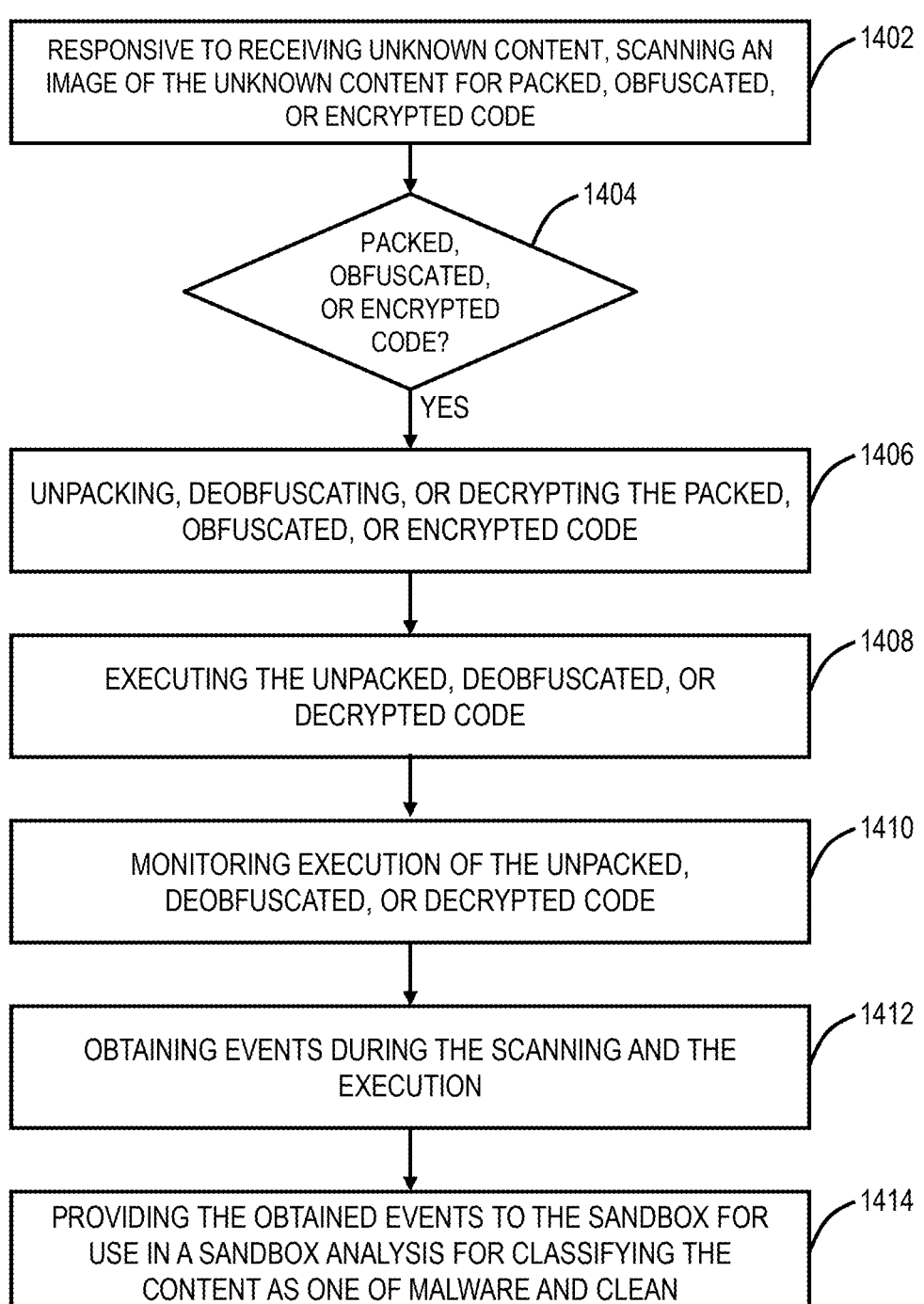

RESPONSIVE TO RECEIVING UNKNOWN CONTENT, SCANNING AN IMAGE OF THE UNKNOWN CONTENT FOR PACKED, OBFUSCATED, OR ENCRYPTED CODE — 1402

PACKED, OBFUSCATED, OR ENCRYPTED CODE? — 1404

YES

UNPACKING, DEOBFUSCATING, OR DECRYPTING THE PACKED, OBFUSCATED, OR ENCRYPTED CODE — 1406

EXECUTING THE UNPACKED, DEOBFUSCATED, OR DECRYPTED CODE — 1408

MONITORING EXECUTION OF THE UNPACKED, DEOBFUSCATED, OR DECRYPTED CODE — 1410

OBTAINING EVENTS DURING THE SCANNING AND THE EXECUTION — 1412

PROVIDING THE OBTAINED EVENTS TO THE SANDBOX FOR USE IN A SANDBOX ANALYSIS FOR CLASSIFYING THE CONTENT AS ONE OF MALWARE AND CLEAN — 1414

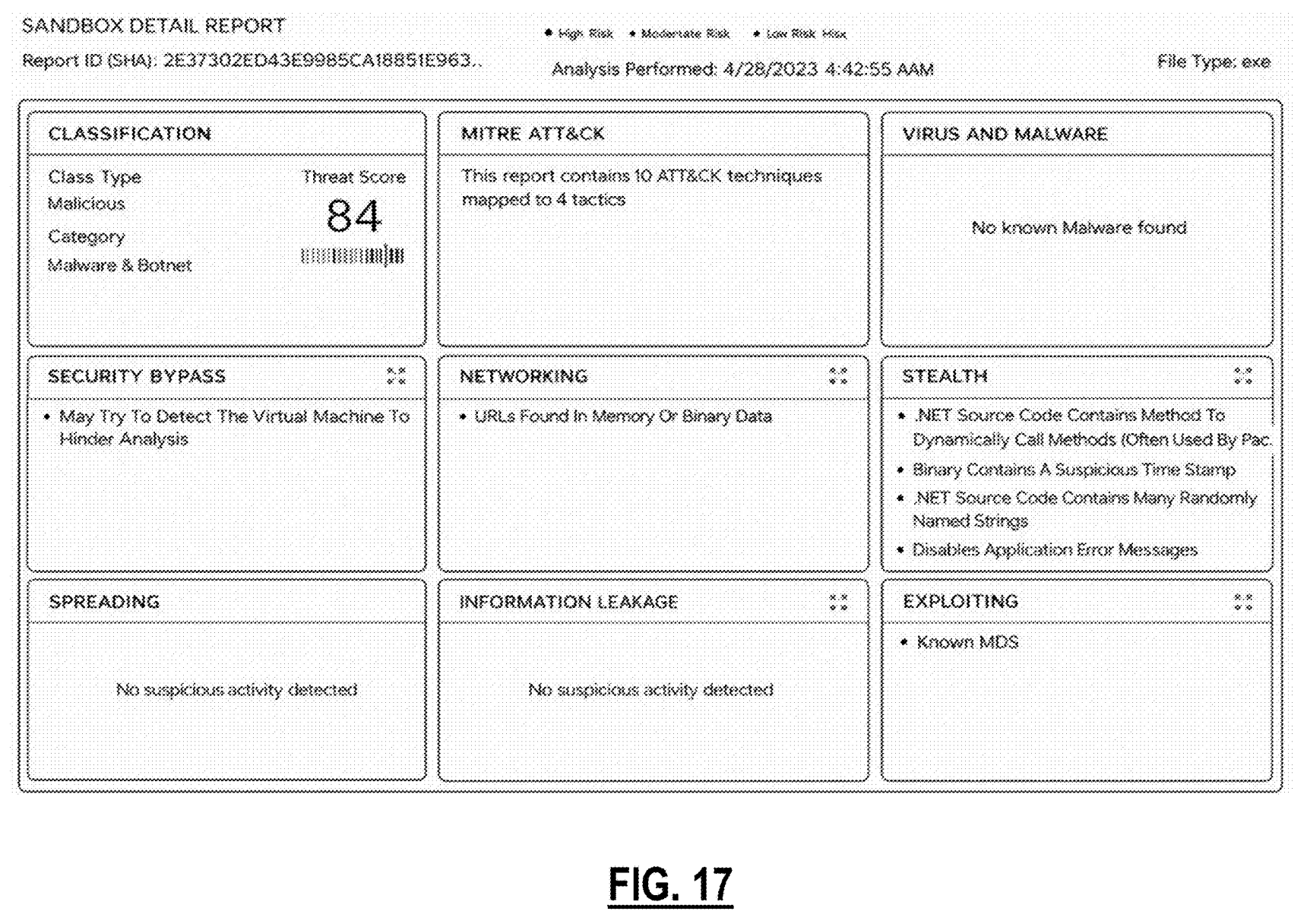

SANDBOX DETAIL REPORT

• High Risk • Moderate Risk • Low Risk Risk

Report ID (SHA): 2E37302ED43E9985CA18851E963..

Analysis Performed: 4/28/2023 4:42:55 AAM

File Type: exe

CLASSIFICATION

Class Type
Malicious

Threat Score

84 |||||||||||||||

Category
Malware & Botnet

MITRE ATT&CK

This report contains 10 ATT&CK techniques mapped to 4 tactics

VIRUS AND MALWARE

No known Malware found

SECURITY BYPASS ::

• May Try To Detect The Virtual Machine To Hinder Analysis

NETWORKING ::

• URLs Found In Memory Or Binary Data

STEALTH ::

• .NET Source Code Contains Method To Dynamically Call Methods (Often Used By Pac

• Binary Contains A Suspicious Time Stamp

• .NET Source Code Contains Many Randomly Named Strings

• Disables Application Error Messages

SPREADING

No suspicious activity detected

INFORMATION LEAKAGE ::

No suspicious activity detected

EXPLOITING ::

• Known MD5

FIG. 17

NODE-2 IDENTIFIES A UNIQUE FILE AND COMPUTES ITS SSHASH

NODE-2    150

VERDICT: GROUPING    QUERY SSHASH

150    NODE-1

150    NODE-3

CDMS    1902

VERDICT: GROUPING

150    NODE-N

QUERY SSHASH

NODE-4    150

NODE-4 IDENTIFIES A UNIQUE FILE AND COMPUTES ITS SSHASH

2000

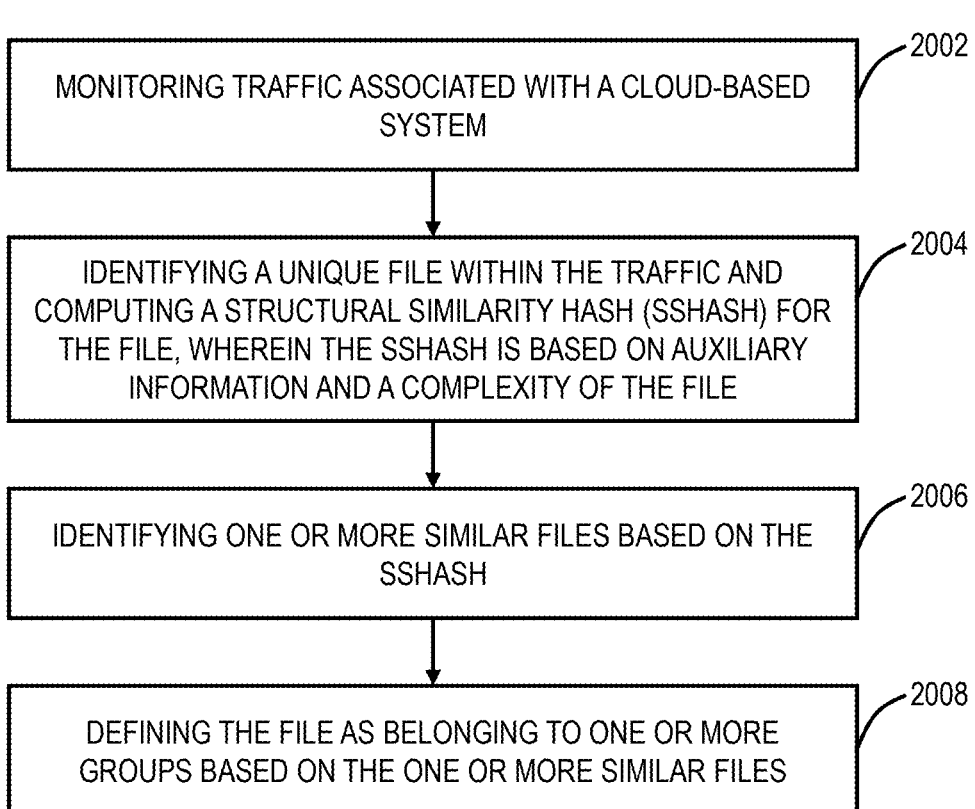

MONITORING TRAFFIC ASSOCIATED WITH A CLOUD-BASED SYSTEM ⌐2002

IDENTIFYING A UNIQUE FILE WITHIN THE TRAFFIC AND COMPUTING A STRUCTURAL SIMILARITY HASH (SSHASH) FOR THE FILE, WHEREIN THE SSHASH IS BASED ON AUXILIARY INFORMATION AND A COMPLEXITY OF THE FILE ⌐2004

IDENTIFYING ONE OR MORE SIMILAR FILES BASED ON THE SSHASH ⌐2006

DEFINING THE FILE AS BELONGING TO ONE OR MORE GROUPS BASED ON THE ONE OR MORE SIMILAR FILES ⌐2008

FIG. 20

SYSTEMS AND METHODS FOR STRUCTURAL SIMILARITY BASED HASHING

FIELD OF THE DISCLOSURE

The present disclosure relates generally to computer networking systems and methods. More particularly, the present disclosure relates to systems and methods for structural similarity based hashing for identification of similar looking samples.

BACKGROUND OF THE DISCLOSURE

Malware, short for malicious software, is software used to disrupt computer operation, gather sensitive information, and/or gain access to private computer systems. It can appear in the form of code, scripts, active content, and other software. 'Malware' is a general term used to refer to a variety of forms of hostile or intrusive software. Malware includes, for example, computer viruses, ransomware, worms, Trojan horses, rootkits, key loggers, dialers, spyware, adware, malicious Browser Helper Objects (BHOs), rogue security software, and other malicious programs; the majority of active malware threats are usually worms or Trojans rather than viruses. As is widely known, there is a need for security measures to protect against malware and the like. Specifically, there is a need for zero-day/zero-hour protection against a rapidly morphing threat landscape. Security processing is moving to the Cloud including malware detection.

BRIEF SUMMARY OF THE DISCLOSURE

In various embodiments, the present disclosure includes a method having steps, a processing device configured to implement the steps, a cloud-based system configured to implement the steps, and as a non-transitory computer-readable medium storing instructions for programming one or more processors to execute the steps. The steps include monitoring traffic associated with a cloud-based system; identifying a unique file within the traffic and computing a Structural Similarity Hash (SSHash) for the file, wherein the SSHash is based on auxiliary information and a complexity of the file; identifying one or more similar files based on the SSHash; and defining the file as being any one of malware, clean, and unknown based on the one or more similar files.

The steps can further include splitting the file into one or more equal length chunks; computing a complexity of each of the one or more equal length chunks; collecting auxiliary information from the file; and generating the SSHash based on the auxiliary information and complexity of the file. Responsive to determining that no similar files exist, the steps can include any of sending the unique file to a sandbox for analysis, learning about the file through self-learning mechanisms, and leveraging threat intelligence services. Identifying one or more similar files can include referencing a SSHash database of files known to be one of malicious or clean. The database can be managed and persisted in a Central Database Management System (CDMS) of the cloud-based system. The monitoring and computing can be performed via one or more nodes of the cloud-based system communicatively coupled to the CDMS, wherein the one or more nodes of the cloud-based system are adapted to send query requests to the CDMS for identifying one or more similar files. The steps can further include performing an action based on the defining, wherein the action includes one of blocking the traffic and allowing the traffic. The steps can further include building an SSHash database prior to the monitoring. Building the SSHash database can include sending a plurality of sample files to a sandbox for labeling the plurality of sample files as malicious, clean, or unknown. In various embodiments, any file type can be given as a sample for the present systems. That is, the unique file can be any of a P file, a Portable Executable (PE) file, a shortcut (LNK) file, a Portable Document Format (PDF) file, an Executable Linkable Format (ELF) file, Android Package Kit (APK) file, Hypertext Markup Language (HTML) file.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

FIG. 3 is a block diagram of a mobile device which may be used in the cloud-based system of FIG. 1 or the like;

FIG. 4 is a flowchart of a behavioral analysis method in the cloud;

FIG. 15 is a flowchart of an in-memory malware unpacking/deobfuscator scanner process.

FIG. 17 is a screenshot of a sandbox output based on the process.

FIG. 20 is a flow chart of a process for sample identification and detection via SSHash.

DETAILED DESCRIPTION OF THE DISCLOSURE

The present disclosure relates to systems and methods for structural similarity based hashing for sample identification and detection. The present systems and methods are adapted to compute a Structural Similarity Hash (SSHash) for files encountered in a cloud-based system. various embodiments are adapted to identify a unique file within traffic and compute a SSHash for the file. The SSHash is based on auxiliary information and a complexity derived from the file. The systems can then query a database for similar files based on the SSHash, and define the file as being any one of malware, clean, and unknown based on the one or more similar files within the database.

Example Cloud-Based System Architecture

Figure 1A:
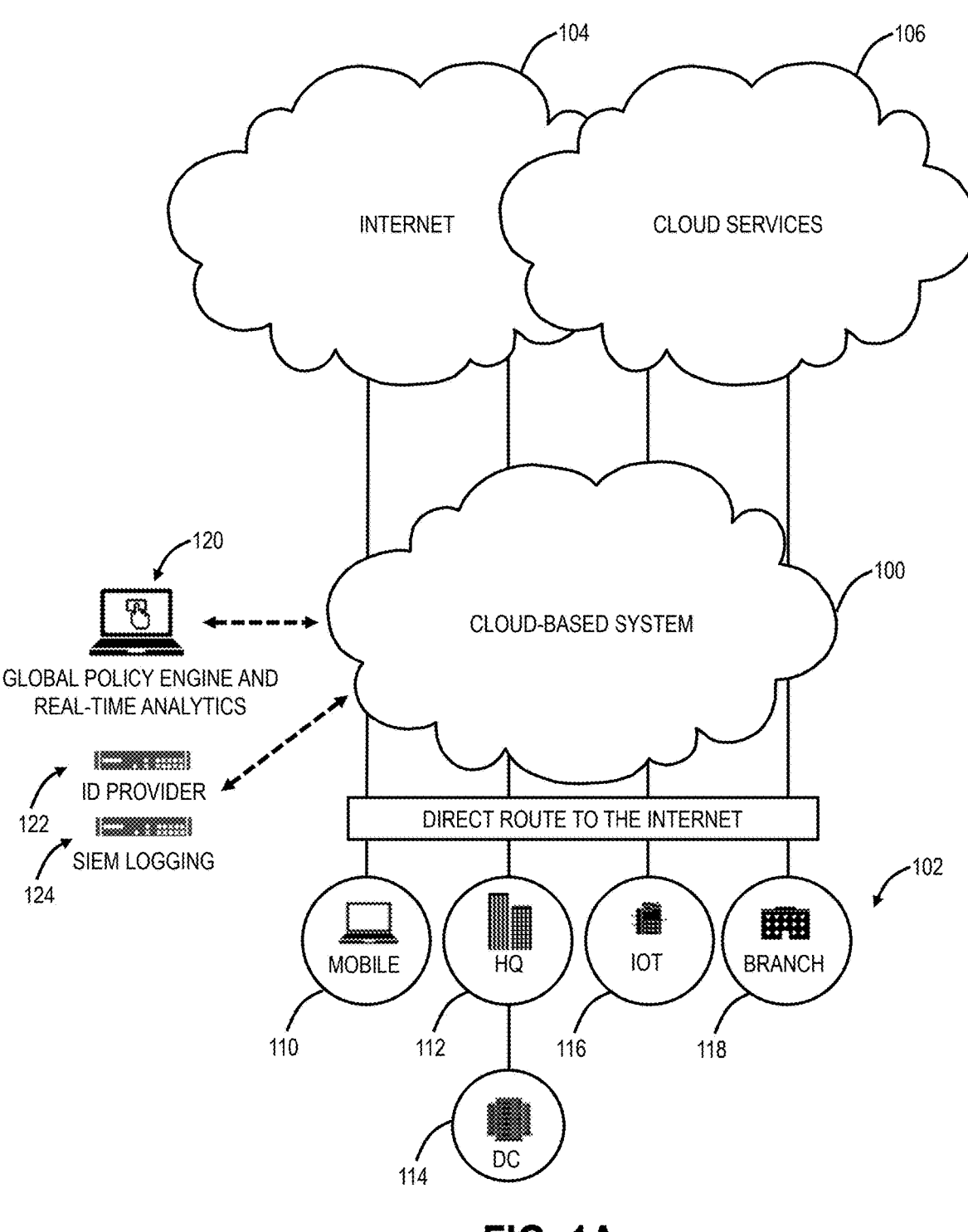
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
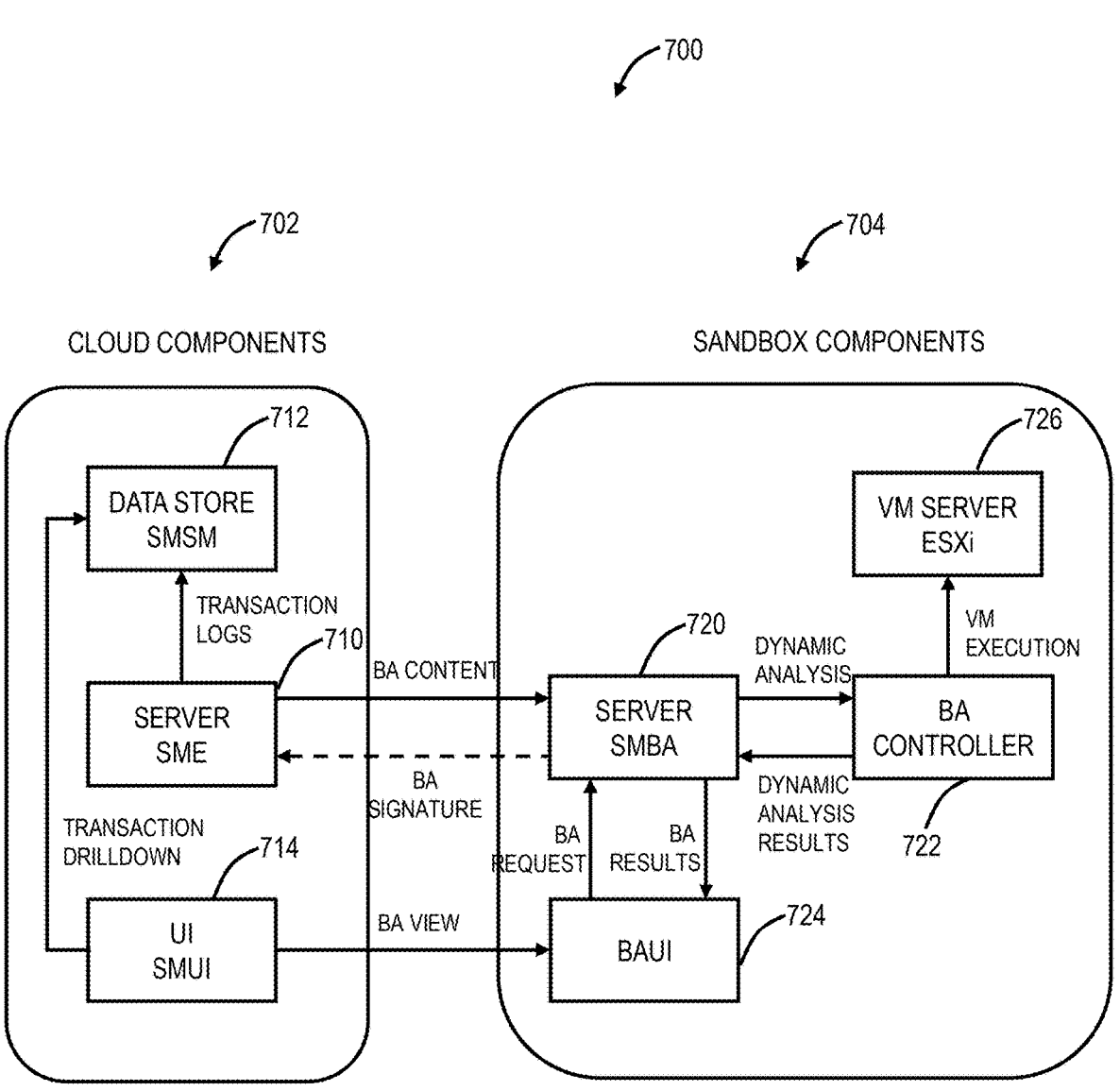
FIG. 5 is a block diagram of an example implementation of a Behavioral Analysis (BA) system for use with the cloud-based system or any other cloud-based system.

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

Figure 1B:
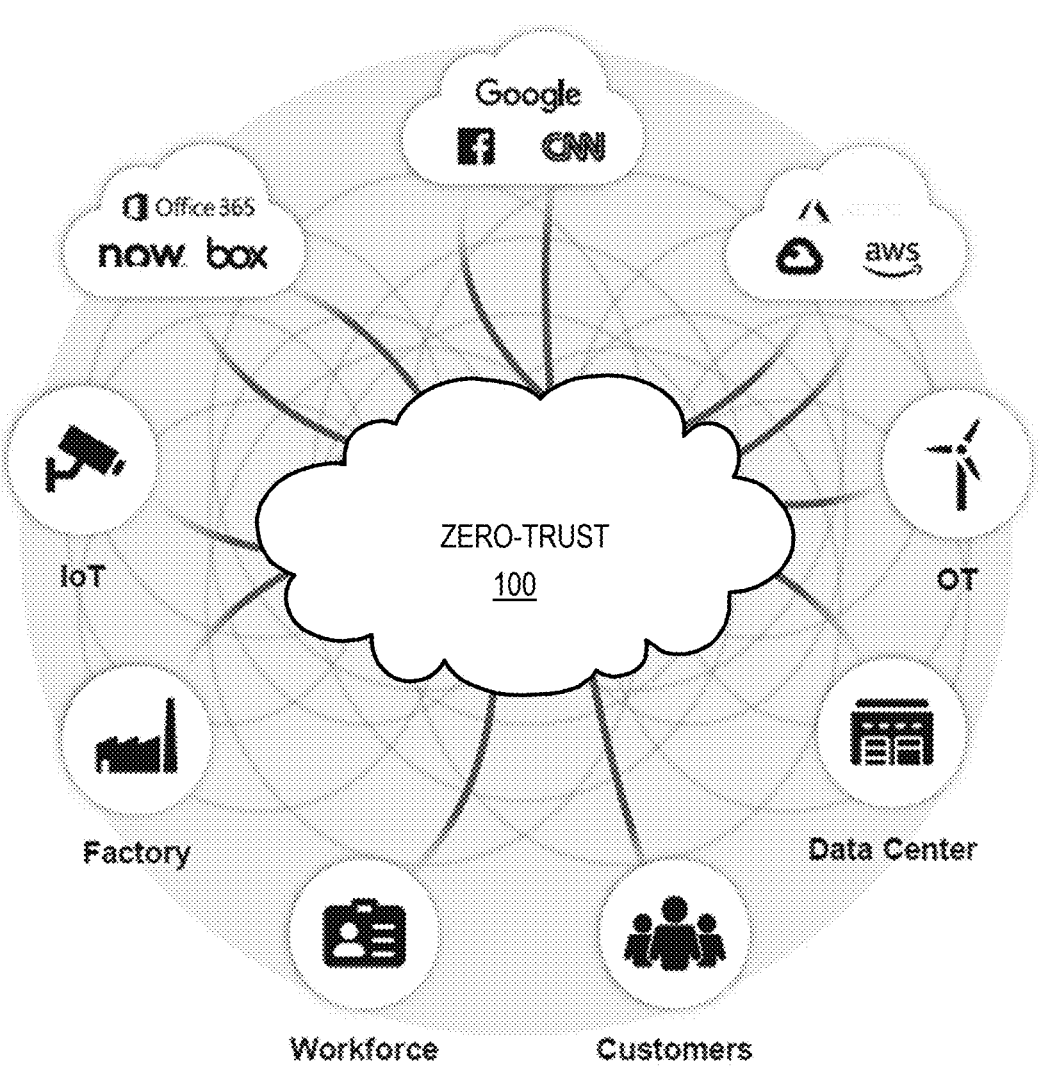
FIG. 1B is a logical diagram of the cloud-based system operating as a zero-trust platform.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.
Zero Trust FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
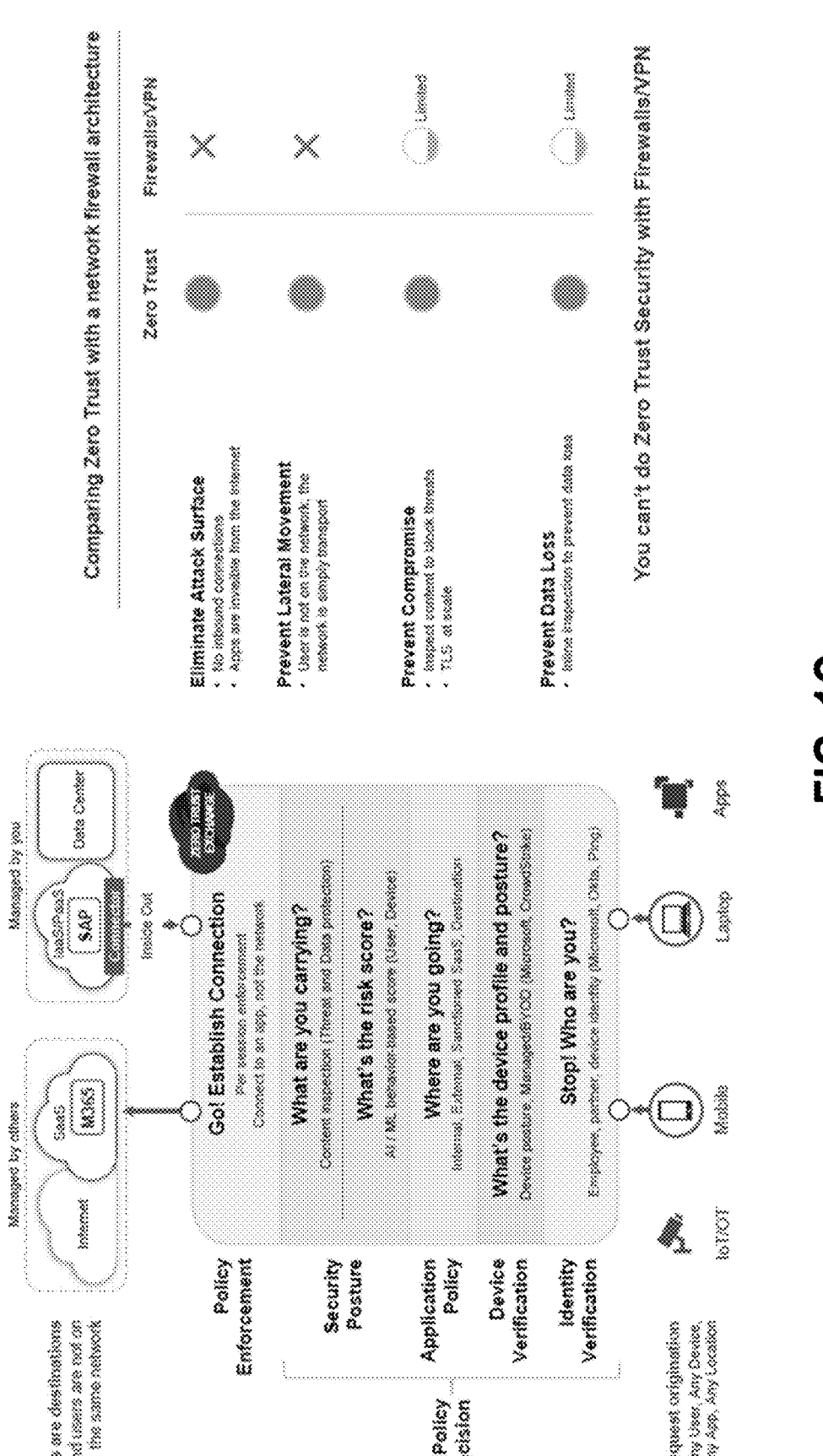
FIG. 1C is a logical diagram illustrating zero trust policies with the cloud-based system and a comparison with the conventional firewall-based approach.
Figure 1D:
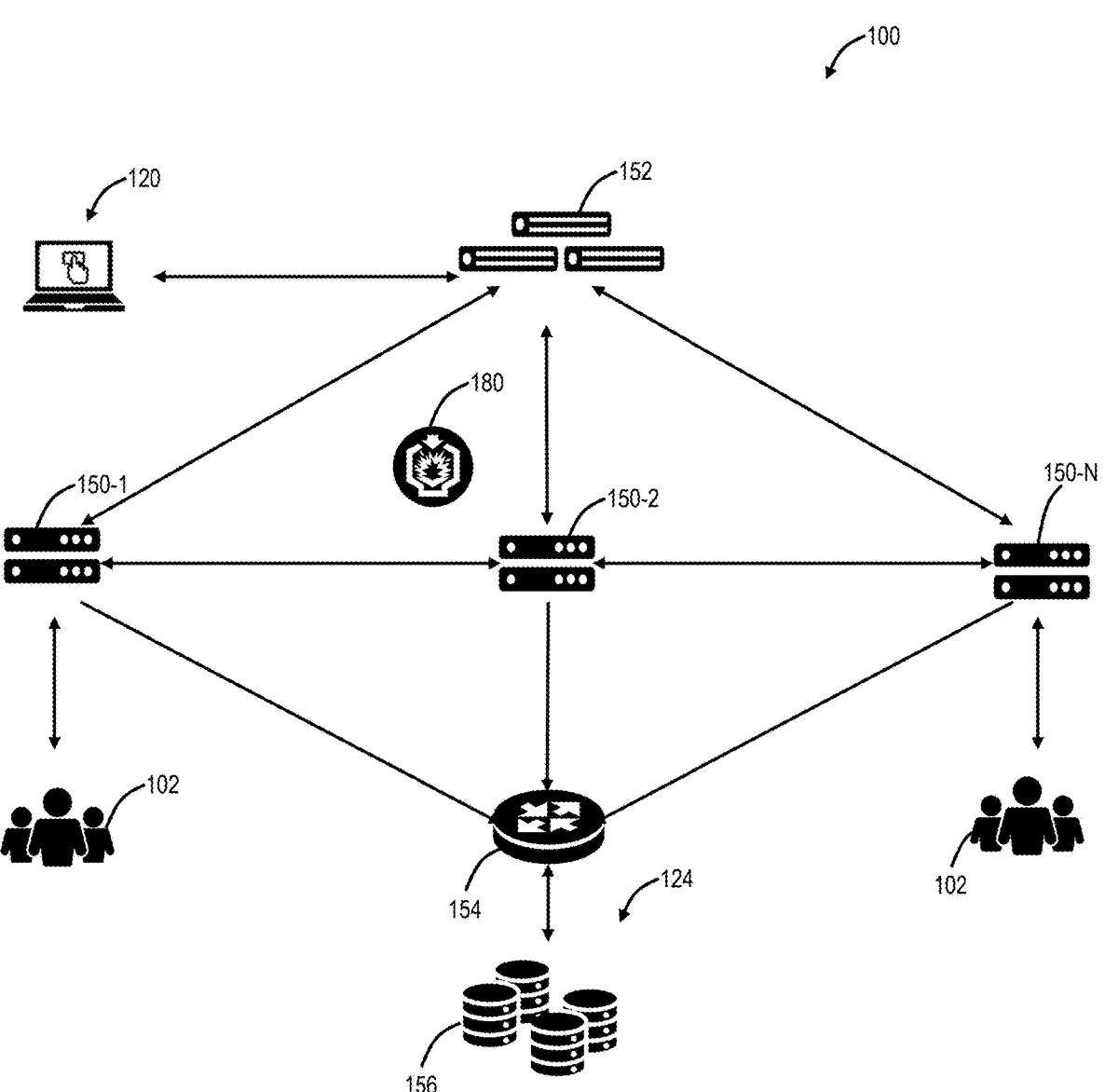
FIG. 1D is a network diagram of an example implementation of the cloud-based system.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.
Example Implementation of the Cloud-Based System FIG. 1D is a network diagram of an example implementation of the cloud-based system 100. In an embodiment, the cloud-based system 100 includes a plurality of nodes (EN) 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, of note, the node described herein may simply be referred to as a node or cloud node. Also, the terminology node 150 is used in the context of the cloud-based system 100 providing cloud-based security. In the context of secure, private application access, the node 150 can also be referred to as a service edge or service edge node. Further, those skilled in the art will recognize the nodes 150 are referred to as "enforcement" nodes based on functionality and other implementations may use different terminology, i.e., these can simply be referred to as nodes, clusters, points, devices, etc. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including nodes, service edge nodes, etc.) can be one or more servers, including physical servers, virtual machines (VM) executed on physical hardware, etc., as described above. The service edge node 150 can also be a Secure Access Service Edge (SASE).

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to an node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), Zscaler Posture Control (ZPC), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). ZPC is a Cloud-Native Application Protection Platform (CNAPP) which is a new category of security products, encompassing the functionality previously found in Cloud Security Posture Management (CSPM) and Cloud Workload Protection Platform (CWPP) products and more. Those of ordinary skill in the art will recognize various other types of cloud services 106 are also contemplated. Also, other types of cloud architectures are also contemplated, with the cloud-based system 100 presented for illustration purposes.

The cloud-based system 100 can include a cloud-based sandbox 180. The cloud-based sandbox 180 can be implemented in one or more of the nodes 150, via a separate set of nodes, or the like. The cloud-based sandbox 180 can be used by the nodes 150 to determine whether unknown content (e.g., executables, documents, or any other type of data) is malicious or not. In an embodiment, the central authority 152 can continually update the nodes 180 with newly detected malware information as described herein through the sandbox 180 for zero-day/zero-hour protection, such as for an allow or block list. Also, while described herein as a "cloud-based" sandbox, those skilled in the art will appreciate the sandboxing techniques and analyses described herein can be used in any format of a sandbox or isolated environment.

Example Server Architecture

Figure 2:
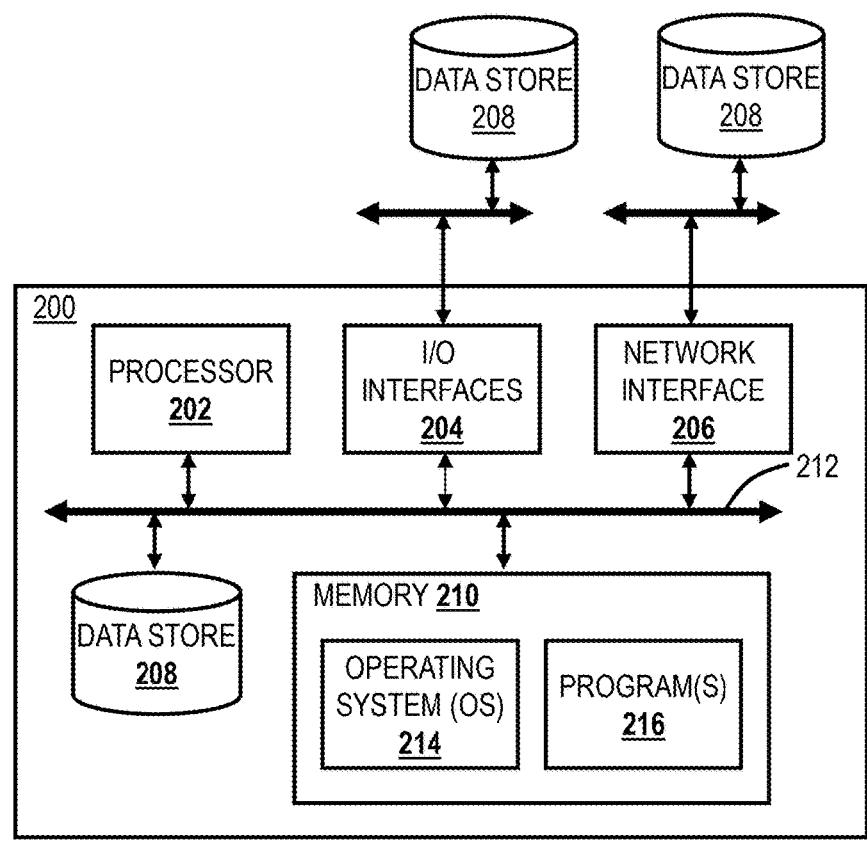

FIG. 2 is a block diagram of a server 200 which may be used in the cloud-based system 100, in other systems, or standalone. For example, the cloud nodes 102 may be formed as one or more of the servers 200. The server 200 may be a digital computer that, in terms of hardware architecture, generally includes a processor 202, Input-Output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 3:
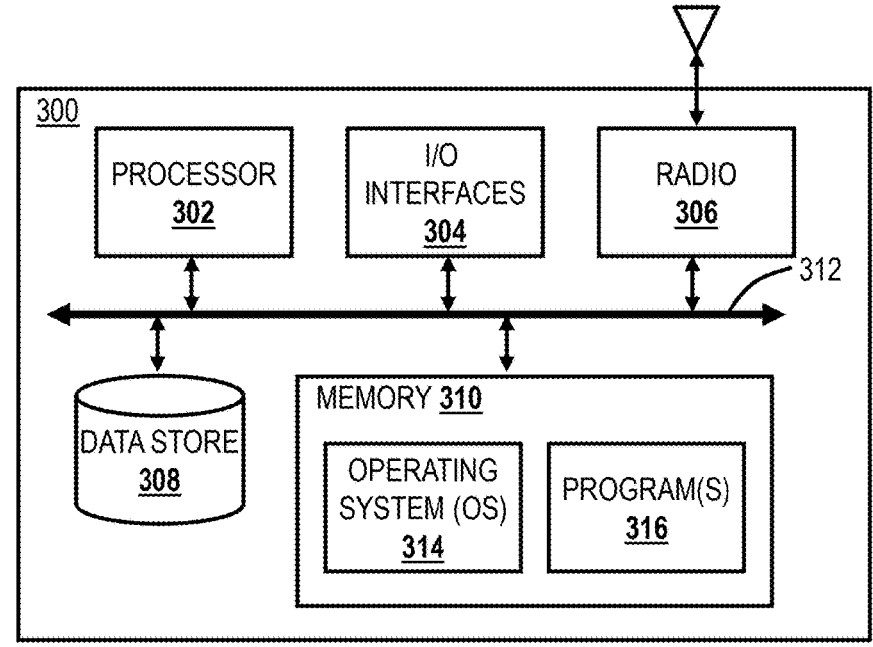

FIG. 3 is a block diagram of a user device 300, which may be used in the cloud-based system 100 or the like. Again, the user device 300 can be a smartphone, a tablet, a smartwatch, an Internet of Things (IoT) device, a laptop, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a Liquid Crystal Display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable Operating System (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Cloud-Based Sandboxing

FIG. 4 is a flowchart of a behavioral analysis method 650 in the cloud. The behavioral analysis method 650 can be implemented through the BA system 600 with any cloud-based system. The cloud-based method 650 includes receiving known malware signatures at one or more nodes in a cloud-based system (step 652). The cloud-based method 650 includes monitoring one or more users inline through the one or more nodes in the cloud-based system for regular traffic processing comprising malware detection and preclusion (step 654). Note, the cloud-based system can also monitor for other security aspects (e.g., viruses, spyware, data leakage, policy enforcement, etc.). The cloud-based method 650 includes determining unknown content from a user of the one or more users is suspicious of being malware (step 656). The cloud-based method 650 includes sending the unknown content to a behavioral analysis system for an offline analysis (step 658). Finally, the cloud-based method 650 includes receiving updated known malware signatures based on the offline analysis (step 660).

The cloud-based method 650 can include performing one of blocking or allowing the unknown content to or from the user based on policy. The one or more users can include a plurality of users associated with a plurality of companies, and the cloud-based method 650 can further include receiving a policy setting for each of the plurality of companies, wherein the policy setting comprises whether or not to perform the offline analysis for the unknown content; and performing the regular traffic processing for the unknown content for users associated with companies with the policy setting of not performing the offline analysis, wherein the regular traffic processing comprises monitoring for malware based on the offline analysis of other users. The cloud-based method 650 can include determining unknown content is suspicious based on an analysis in the one or more nodes based on smart filtering determining that the unknown content is an unknown, active software file that performs some functionality on the user's device. The cloud-based method 650 can include storing the unknown content in the behavioral analysis system and maintaining an event log associated with the unknown content in the behavioral analysis system; and performing the offline analysis on the unknown content comprising a static analysis and a dynamic analysis. The unknown content can be stored in an encrypted format, and the cloud-based method 650 can include storing results data from various stages of the offline analysis of the unknown content, wherein the results data includes static analysis results, JavaScript Object Notation (JSON) data from the dynamic analysis, packet capture data, screenshot images, and files created/deleted/downloaded during the dynamic analysis.

The static analysis can evaluate various properties of the unknown content, and the dynamic analysis runs the unknown content on a virtual machine operating an appropriate operating system for the unknown content. The cloud-based method 650 can include performing the offline analysis as a combination of a static analysis and a dynamic analysis by the behavioral analysis system. The static analysis can evaluate various properties of the unknown content using a set of tools based on a type of file of the unknown content, wherein the set of tools comprise any of checking third party services to match the unknown content to known viruses detected by various anti-virus engines, using a Perl Compatible Regular Expressions (PCRE) engine to check the unknown content for known signatures, identifying code signing certificates to form a whitelist of known benign content using Portable Executable (PE)/Common Object File Format (COFF) specifications, and evaluating destinations of any communications from the dynamic analysis. The dynamic analysis can run the unknown content on a virtual machine operating an appropriate operating system for the unknown content and evaluates any of JavaScript Object Notation (JSON) data generated; temporary files generated, system and registry files modified; files added or deleted; processor, network, memory and file system usages; external communications; security bypass; data leakage; and persistence.

Sandbox System

FIG. 5 is a block diagram of an example implementation of a Behavioral Analysis (BA) system 700 for use with the cloud-based system 100 or any other cloud-based system. FIG. 5 is presented as an example implementation for the sandbox 180, and those of ordinary skill in the art will appreciate other implementations providing similar functionality are also contemplated. The BA system 700 can include cloud components 702 and sandbox components 704. The cloud components 702 can include the cloud nodes 102, etc. The cloud components 702 are generally used to monitor users in the cloud, to detect known malware, to provide unknown files that could be malware to the sandbox components 704, and to receive updates to known malware from the sandbox components 704. The sandbox components 704 are generally configured to receive unknown files and determine whether they are malicious (malware) or benign and provide this information to the cloud components 702. The sandbox components 704 can perform a static analysis and a dynamic analysis of the unknown files in an offline manner whereas the cloud components 702 are configured to detect malware inline. As described herein, the sandbox components 704 can also be referred to as BA infrastructure.

Figure 6:
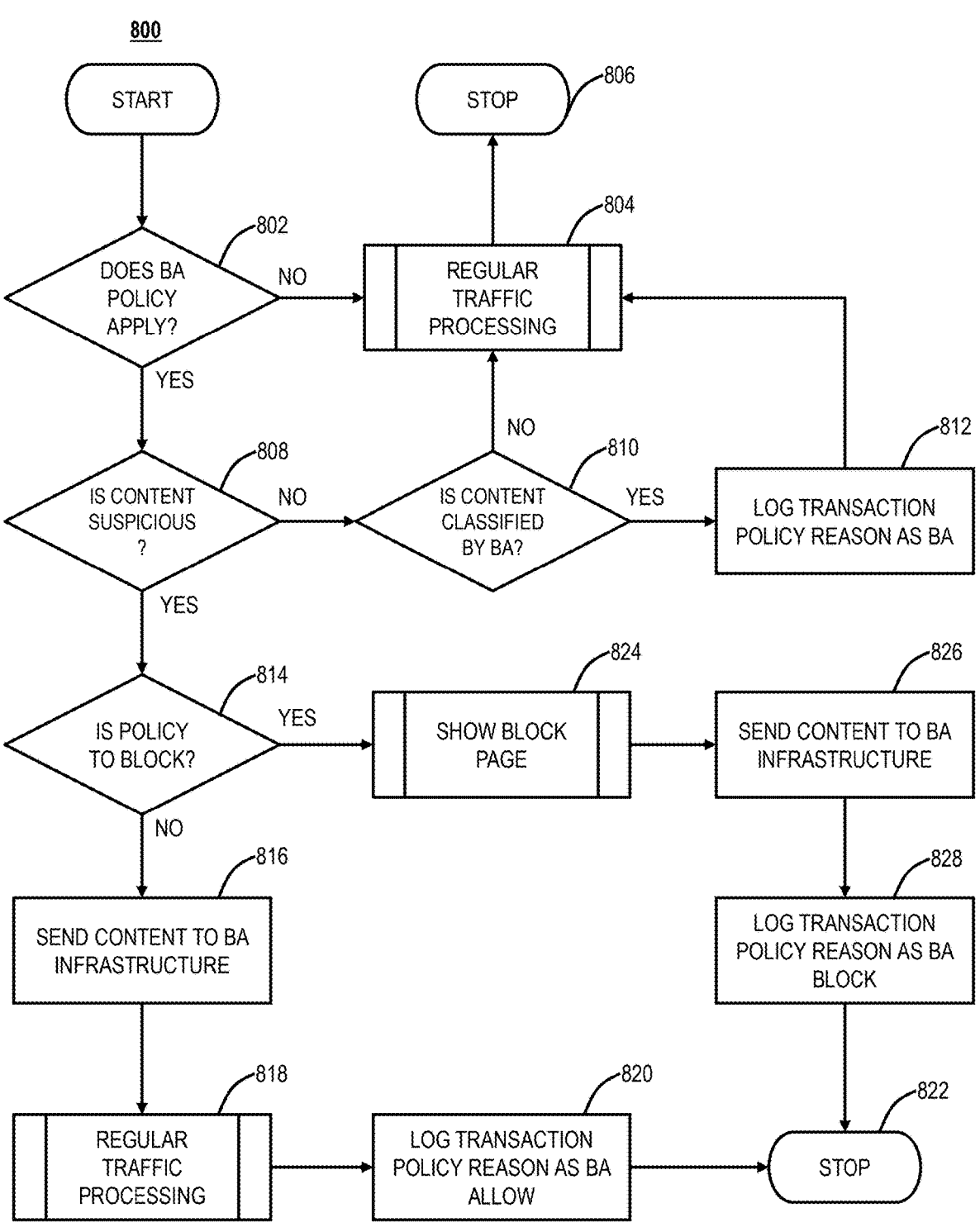
FIGS. 6-8 are flowcharts of example operational methods associated with the BA system of FIG. 5 including methods performed by the server in the cloud components (FIG. 6), the server in the sandbox components (FIG. 7), and the BA controller (FIG. 8)
Figure 7:
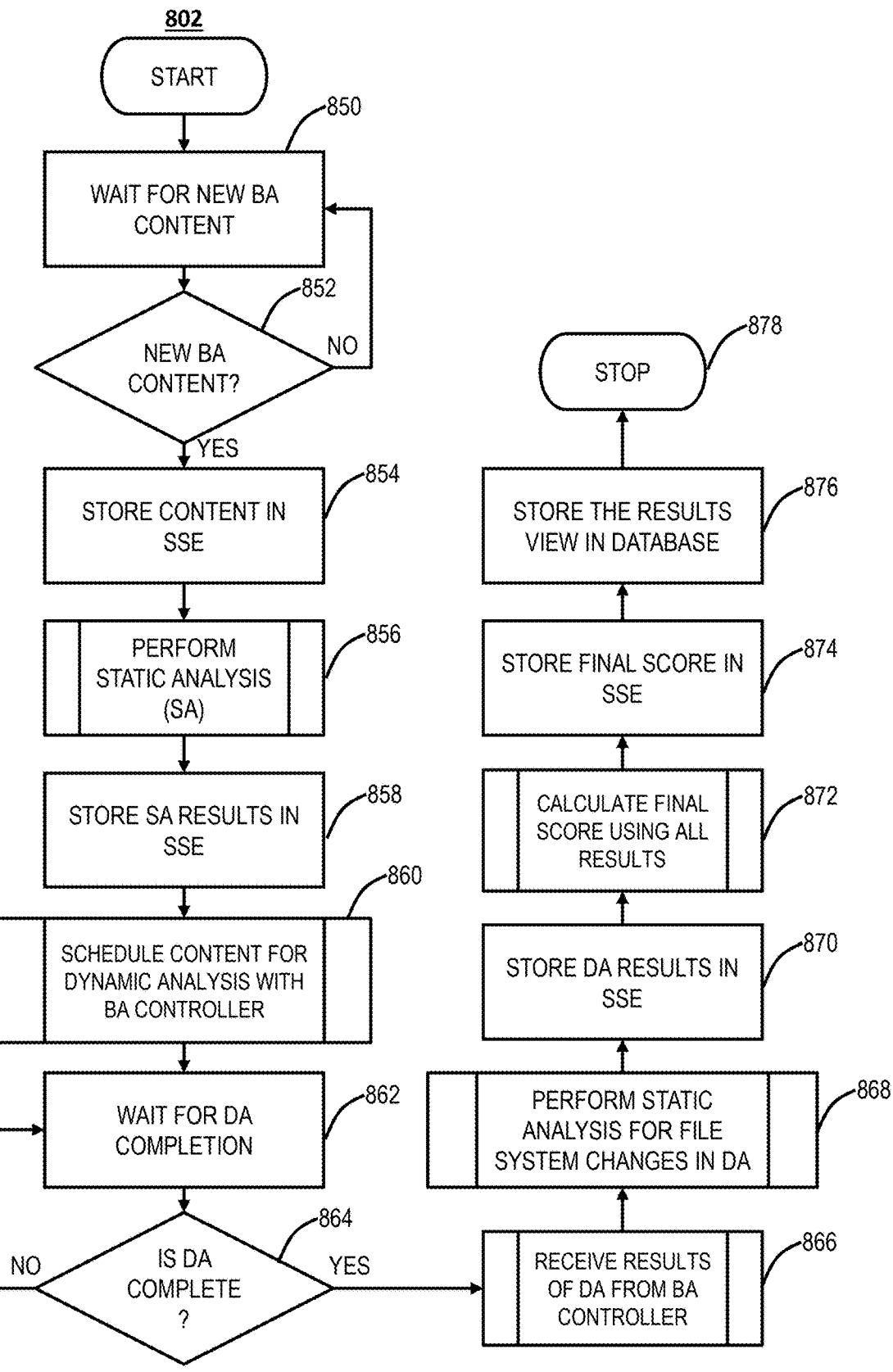
Figure 8:
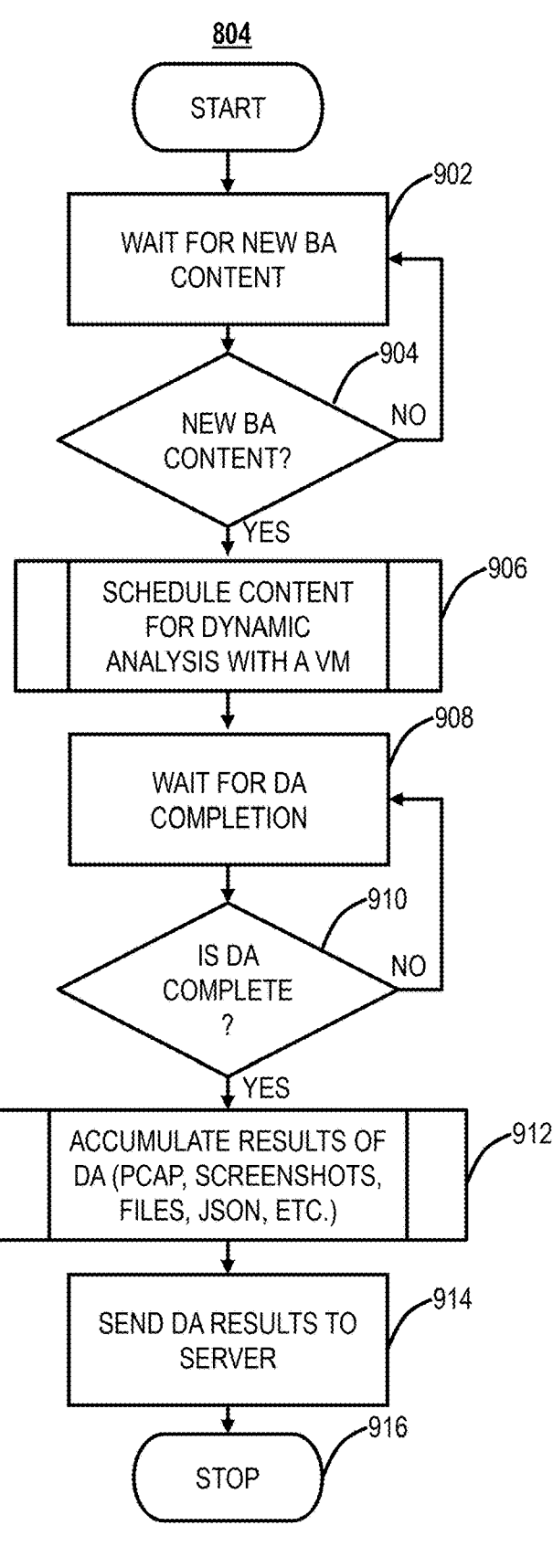

The cloud components 702 can include a server 710 (or plurality of servers 710), a data store 712, and a user interface (UI) 714. The server 710 can include the processing nodes 110, the cloud nodes 502, etc. and the server 710 is generally the initiator and final consumer of results from the BA system 700, i.e. the server 710 inter alia detects and precludes malware as well as flagging unknown files for BA analysis by the BA system 700. The data store 712 can be a storage mechanism for all transaction logs and reporting mechanisms. The UI 714 can provide the ability to configure BA policies as well as turning it on/off at a company level. It is also the gateway to all reports and forensic analysis. The sandbox components 704 can include a server 720, a BA controller 722, a BAUI 724, and a Virtual Machine (VM) server 726. The server 720 provides a gateway to the BA infrastructure in the sandbox components 704 and acts a consolidated secure (encrypted) storage server for BA content. The BA controller 722 provides sandboxing functionality for performing dynamic analysis of BA content. The BAUI 724 provides a user interface to view the analysis results of BA content. Finally, the VM server 726 provides a VM infrastructure used by the BA controller 722 for dynamic analysis of BA content. Note, the cloud components 702 and the sandbox components 704, as described herein, can be a combination of hardware, software, and/or firmware for performing the various functionality described herein. FIGS. 6-8 are flowcharts of example operational methods 800, 802, 804 performed by the server 710 (FIG. 6), the server 720 (FIG. 7), and the BA controller 722 (FIG. 8).

Variously, the sandbox components 704 are configured to distribute known malware signatures to the cloud components 702, e.g., the distributed cloud nodes. The cloud components 702 monitor inline users such as using HTTP and non-HTTP protocols (to cover proxy and firewall/DPI) to detect and block/preclude malware. In addition, the cloud components 702 perform intelligent collection of unknown malware from distributed cloud nodes. The nodes decide what is unknown malware-smart filtering based on signatures and static/dynamic analysis criteria that can be performed quickly inline and send it securely and efficiently to BA Analysis engine in the cloud, i.e. the sandbox components 704. The sandbox components 704 is a BA Analysis Engine which includes secure content storage with data destruct capabilities, is a scalable and flexible platform for VM based execution sandboxes, includes a smart scheduler to determine what needs to be analyzed and manage BA content from the cloud, and includes threat reporting storage and UI infrastructure for malware result analysis and research. The sandbox components 704 can provide dynamic updates based on latest malware analysis thereby providing zero-day/zero-hour protection.

FIG. 6 illustrates an operational method 800 performed by the cloud components 702, such as the server 710. The server 710 is the initiator for the BA logic sequence. Generally, the server 710 is configured to process policy information related to BA, and this can be managed with flags to enable/disable the feature at the company level. The server 710 is further configured to consume signatures (related to BA) that are created by the BA infrastructure, i.e. the sandbox components 704 and the like. The signatures can be in the form of MD5 hashes or the like. The server 710 is configured to enforce policy based on configuration, to log transactions to the data store 712 with information included therein such as policy reason and Threat category/super category information, and to send BA content to the BA infrastructure (specifically the server 720). In an embodiment, the server 710 can be the cloud node 102, etc. That is, the server 710 is generally performing inline traffic processing between a user and another domain mechanisms as a cloud-based system (security-as-a-service).

The server 710 can perform various aspects of inline traffic processing such as virus detection and prevention, malware detection and prevention, data leakage prevention, policy enforcement, etc. The focus here is on malware detection and prevention, but it is expected that the server 710 also provides other security functions. As described herein, malware includes code, scripts, active content, and other software that is used to disrupt computer operation, gather sensitive information, and/or gain access to private computer systems. That is, malware is active software installed on a user's device for malicious purposes and can include executable files (e.g., .EXE), Dynamic Link Libraries (DLL), documents (e.g., .DOCX, .PDF, etc.), etc. The server 710, in conjunction with the server 720, can include a set of known malware that is detected and precluded. However, as malware is constantly evolving, there is a need to detect quickly (zero-day/zero-hour protection) new malware files. This is the objective of the BA infrastructure—to sandbox potential files for malware BA and to update the set of known malware based thereon.

The operational method 800 starts and determines if a BA policy applies (step 802). The BA policy determines whether or not processing for a particular user, company, set of users, etc. utilizes the BA infrastructure. Note, the BA policy does not mean whether or not the server 710 scans for known malware; rather the BA policy determines whether the server 710 performs BA on unknown files that could possibly be malware to detect new malware and add to the list of known malware. If there is no BA policy (step 802), the operational method 800 performs regular traffic processing (step 804). The regular traffic processing can include the various techniques and processes described herein for security in the cloud, and the operational method 800 stops (step 806). If there is a BA policy (step 802), the operational method 800 checks if the content is suspicious (step 808). Content may be suspicious, from a malware perspective, if it is unknown, active software that performs some functionality on the user's device. Determining the content is suspicious can be based on smart filtering that performs a quick analysis inline in the cloud. If the content is not suspicious (step 808), the operational method 800 checks if the content is already classified by the BA or another system (step 810), and if so, the operational method 800 makes a log transaction for the content with a policy reason as BA (step 812). If the content is not already classified (step 810), the operational method 800 performs the regular traffic processing (step 804).

If the content is suspicious (step 808), the operational method 800 checks whether the policy is to block or not (step 814). Note, suspicious content may or may not be malware; it is the purpose of the BA infrastructure (e.g., the sandbox components 704) to determine this. However, the operational method 800 can allow or block the suspicious content (while also sending the suspicious content to the BA infrastructure. If the policy is not to block (step 814), the operational method 800 sends the content to the BA infrastructure (e.g., the sandbox components 704 for performing the functionality in FIGS. 7 and 8) (step 816). Next, the operational method 800 performs regular traffic processing (step 818) (same as step 804), the operational method 800 logs the transaction as a policy reason BA allow (step 820), and the operational method 800 ends (step 822). If the policy is to block (step 814), the operational method 800 blocks the content and shows the user a block page (step 824). The block page notifies the user that the content was suspicious and blocked. The operational method 800 sends the content to the BA infrastructure (e.g., the sandbox components 704 for performing the functionality in FIGS. 7 and 8) (step 826), the operational method 800 logs the transaction as a policy reason BA block (step 820), and the operational method 800 ends (step 822).

The UI 714 provides the ability to configure policy at the company level, or at some set or subset of users, with features that are enabled/disabled using a few checkboxes, for example. The UI 714 provides a high-level view of the BA system 700 for a company using specific BA reports, and the UI 714 provides the ability to view analysis details of any threat from transaction drill-downs. The data store 712 is configured to store transaction logs from the server 710, to provide counter infrastructure for all BA reports, and to provide querying infrastructure for BA transactions. For example, the data store 712 can add a new BA record and handle it in live/sync data paths, perform query module handling for this new BA record, also some new filters will be added for BA like MD5, perform BA counter handling, and the like. For example, the counter infrastructure can use the following dimensions:

| Dimension | Values |
|---|---|
| MalwareReason | One of the following values [Submitted, Benign, Suspicious, Adware, Malware, Anonymizer] |
| Direction | One of the following values [Inbound, Outbound] |
| Action | [Allowed, Blocked] |

The UI 714 can provide various reports such as a combination of the following filters for drill-down:

| Chart Type | Drilldown Area |
|---|---|
| BA Actions | Blocked |
| BA Actions | Quarantined |
| BA Actions | Sent for Analysis |
| BA Categorization | Suspicious Behavior |
| BA Categorization | Botnet & Malware Behavior |
| BA Categorization | Adware Behavior |
| BA Categorization | Anonymizer Behavior |

FIG. 7 illustrates an operational method 802 performed by a gateway element in the BA infrastructure (e.g., the sandbox components 704), such as the server 720. The server 720 is a critical component in the BA architecture that integrates all the other subsystems; it is the central authority for all things involved with BA. The server 720 (or gateway to the BA infrastructure) has the following functional components a Secure Storage Engine (SSE), a Static Analysis Engine (SAE), a Dynamic Analysis Scheduling Engine (DASE), a Database Engine, a Scoring Engine, and a Reporting Engine. The SSE is responsible for the persistent storage of the BA Content to be analyzed. The results of the analysis is stored in the SSE, as well. All data related to the customers are stored in encrypted format using symmetric keys (e.g., AES256). The encryption keys are generated (well in advance) at regular intervals. The encryption keys are not stored in SSE. They are retrieved at runtime from the Certificate Management Server (currently Central Authority [SMCA] in the sandbox components 704), i.e. they are retrieved at runtime on the server 720 for use. The SSE can store an activity ledger for all that has happed for the content which various events recorded, such as what happened to the content? what state is the content in? and, in case of a crash, to continue processing the content from where it was left off. Example events can include storing the content, completing a static analysis of the content, starting a dynamic analysis of the content, completing the dynamic analysis of the content, calculating a final score for the content, and modifying the score of the content. The SSE can also store results data at various stages of analysis of the content, such as Static Analysis Results, JavaScript Object Notation (JSON) data from the Dynamic Analysis, Packet Capture Data, Screenshot Images, and Files created/deleted/downloaded during the sandbox analysis.

The BA infrastructure generally uses two techniques to evaluate unknown content to detect malware—Static Analysis and Dynamic Analysis—and results of the two are scored to determine whether or not the unknown content is malware. Generally, the Static Analysis looks at various properties of the unknown content, whereas the Dynamic Analysis actually runs the unknown content. The SAE analyzes the unknown content for known signatures (benign or malicious) using a set of tools based on the type of the file. Some example tools include:

VirusTotal: Using a Web Application Programming Interface (API), the MD5 of the unknown content is sent to a third-party service to check for known viruses as determined by various anti-virus (AV) engines;

YARA tool: Using a Perl Compatible Regular Expressions (PCRE) engine, the unknown Content is analyzed for known signatures. The signatures are sourced from various third-party services as well as internally developed by the operators of the distributed security system 100;

Certificate Analysis: Using Portable Executable (PE)/Common Object File Format (COFF) specifications, identify the code signing certificates to form a whitelist of known benign content; and Zulu (available from zscaler.com): Using the URL Risk Analyzer, the original URL as well as the IPs and URLs resulting from the Dynamic Analysis are further analyzed.

Basically, the SAE looks for known attributes that could lead the unknown content to be malware—such as previously detected signatures, detecting known malware signatures, analyzing the source of the unknown content, etc.

The DASE schedules the Dynamic Analysis, which is performed by the BA controller 722 and VM server 726. The Dynamic Analysis can be referred to as sandboxing where the unknown content is thrown into a "sandbox," i.e., the VM server 726, and run to see what happens. The DASE is configured to schedule the unknown content within the limitations of the Sandboxing Infrastructure (i.e., the BA controller 722 and the VM server 726). The DASE can act as queuing manager and scheduler. After static analysis, unknown content can be queued based on priority (known viruses get lower priority), availability, and content type. For example, if an unknown content is identified as a Windows executable/DLL it needs to be sent to the BA Controller 722 which uses a Windows guest Operating System (OS), if an unknown Content is identified an Android application package file (APK), it needs to be sent to the BA controller 722 which uses an Android OS, etc.

The Database Engine is used to maintain a view of data as stored in the SSE. Customer-centric data that requires to be stored in an encrypted format may not be stored in the database. This is a temporary arrangement for quicker access to preformatted data for research purposes. The database tables can be designed in such a way so as to avoid row updates (as much as possible) during runtime. In case of any conflicts with the data in the SSE, the SSE can be the authority, and the view in database can be recreated at any point from the data in the SSE. The Scoring Engine is for analyzing the results using a configurable scoring sheet to arrive at a final score for the unknown content once all of the Behavioral Analysis is complete. For example, the Scoring Sheet is a file serialized in JSON format that provides individual scores for various components in the analysis. The Reporting Engine provides a querying interface for the BAUI 724 to display the required results of the Behavioral Analysis to the user. The results for the commands can be retrieved from one of the following sources: Information available in memory (cache) score, category, etc.; Information available in disk (SSE), packet captures, screenshots, etc.; Information available in the database Protocol Information (HTTP/SMTP), etc.; and any combination thereof.

The server 720 interfaces to the server 710 (receiving BA content from the server 710 and sending BA signatures to the server 710), the BAUI 724 (sending BA results to the BAUI 724 and receiving BA requests from the BAUI 724), and the BA controller 722 (queuing a Dynamic Analysis by the BA controller 722 and receiving Dynamic Analysis results from the BA controller 722). The operational method 802 starts, such as at startup of the server 720, and waits for new BA content (steps 850, 852). The operational method 802 stores new content in the SSE (step 854), and performs the Static Analysis (SA) (step 856). The operational method 802 stores the SA results in the SSE (step 858) and schedules the BA content for Dynamic Analysis (DA) with the BA controller 722 (step 860). The operational method 802 waits for completion of the DA (steps 862, 864). The operational method 802 receives results of the DA from the BA controller 722 (step 866).

Next, the operational method 802 can perform a static analysis for file system changes in the DA (step 868). Here, the operational method 802 is looking to see what changes the BA content made when executed or opened in the DA. The operational method 802 stores the DA results in the SSE (step 870). The operational method 802 calculates a final score for the BA content using all results-SA and DA (step 872). The final score can also be manually be modified if reviewed by operators of the BA system 700. The final score is stored in the SSE (step 874), the operational method 802 stores the results view in the database (step 876), and the operational method 802 ends (step 878).

FIG. 8 illustrates an operational method 804 performed by the BA controller 722 in the BA infrastructure (e.g., the sandbox components 704). The BA Controller 722 is the engine that controls the sandboxing environment. The sandbox is used to execute the BA content in a controlled VM environment, such as on the VM server 726. It then evaluates the file system changes, network activity, etc., to analyze the threat posed by the BA content. The BA controller 722 performs the following functions: Receives BA Content from the server 720 and sends it for execution (Dynamic Analysis (DA)) with one of the available VM guests on the VM server 726; accumulates all the pertinent results (results in JSON format, packet capture, screenshots, file system changes, etc.) from the DA and send them to the server 720; cleans up temporary files generated; and tracks CPU, network, memory and file system usages on the controller for monitoring. Note, the VM server 726 can be implemented on the BA controller 722 or in another device.

The operational method 804 starts and waits for BA content (steps 902, 904). The operational method 804 schedules received BA content for the Dynamic Analysis with a VM (step 906). The operational method 804 waits for completion of the DA (steps 908, 910). The operational method 804 accumulates results of the DA (e.g., packet capture (PCAP), screenshots, files, JSON, etc.). The operational method 804 sends the DA results to the server 720 (step 912), and the operational method 804 ends (step 916).

The VM server 726 provides a VM infrastructure for use by the BA Controller 722 for Dynamic Analysis. The VM server 726 can utilize conventional sandboxing functionality, and can operate all Windows-based systems (Windows XP, Windows 7 32/64 bit, Windows 8/8.1 32/64 bit, Windows 10, etc.) as well as Android, IOS, macOS, Linux, etc. The BAUI 724 is a web application deployed on a server in the sandbox components 704. It can also be deployed on separate hardware. It primarily provides the following functionality: provides a user interface for the detailed analysis of a BA Content, and provides a user interface for the Security Research team to manage the various threats.

Dynamic YARA

YARA is the name of a tool primarily used in malware research and detection that provides a rule-based approach to create descriptions of malware families based on textual or binary patterns. A description is essentially a YARA rule name, where these rules include sets of strings and a Boolean expression. The language used has traits of Perl compatible regular expressions.

The present disclosure provides an approach to enhance the detection capabilities of the cloud sandbox 180. At times there are cases where it is not possible to modify Sandbox signatures due to risk of False Negatives. The present disclosure can address the specific False Positive (FP) cases. Features of the present disclosure include Malware detection efficacy, Malware attribution, Dynamic scoring, Writing a YARA rule on unpacked Portable Executable (PE) files, and Dynamic chaining of cloud sandbox signatures.

The Portable Executable format is a file format for executables, object code, DLLs, FON Font files, and others used in 32-bit and 64-bit versions of Windows operating systems. The PE format is a data structure that encapsulates the information necessary for the Windows OS loader to manage the wrapped executable code.

The approach described herein includes three components—1) Dynamic YARA engine, 2) Dynamic YARA Python signature, and 3) Dynamic YARA rules.

Dynamic YARA Engine

The Dynamic YARA engine is part of the sandbox 180 and configured to generate events. Specifically, the Dynamic YARA engine collects data (hereafter referred to as dynamic data) from different sandbox events, with some examples listed in Table 1. These sandbox events provide dynamic and static information about the malware samples.

| Sandbox event name | Event data used | Field name in dynamic | Example |
|---|---|---|---|
| staticgen | File extension (Extracted value) | staticgen:filetype: | staticgen:filetype:exe |
| sigid | ID of sandbox signatures hits | sigid: | sigid:767 |
| filedumps | Path of all dropped files. | filedump:path: | filedump:path:C:\test.txt |
| windows | Title and Text of windows | window:title: window:text: | window:title:Setup window.text:This is installer |
| dnsQuery | dnsQuery name | dnsquery:name: | dnsquery:name:google.com |
| staticOLEEntry | vbacodedeobfuscat at ed data from | staticoleentry:vbaco deobfuscated: processcreated:path: | staticoleentry:vbacodedeobfus cated:Dim VBAMacro_code processcreated:path:C:\windo ws\mal.exe |
| processCreated | Path and command line value of all | processcreated:cmd line: | processcreated:cmdline:C:\ windows\system32\cmd.exe /c dir |
| memstrings | Memory strings | memstring:string: | memstring:string:Y..y.Hc.H..H.\| $8f.\$0D.\$ L.T$...H. |
| mutantCreated | Mutex name | mutantcreated:name: | mutantcreated:name:_!SHMS FTHISTORY!_ |
| http, https, httpData | Header data and extracted other http request fields | http:header: | It includes both http and https. http:header:POST /59C9AEA632140C63AFA3D73 18 940E42C6CA421A9C1 HTTP/1.1 Accept: */* Content-Type: application/x-www-form-urlenco ded User-Agent: Mozilla/5.0 Windows NT 6.1; WOW64; rv:25.0 Gecko/20100101 |
| | | http:rawdata: | Data sent or received in http request (converted to hex) http:rawdata:80000000302460 cac85371cd92dcdf526430fd3b 8f9c2a3f7a5d39af41 |
| keyValueCreated | New registry key Path, name and newdata created | keyvaluecreated:path: | keyvaluecreated:path:HKEY_ USERS\Software\Microsoft\ Office/12.0/Word |
| | | keyvaluecreated: name: | keyvaluecreated:name:MTTT |
| | | keyvaluecreated: newdata: | New data added to registry key. Data can be ASCII/Unicode and binary (represented as hex string) keyvaluecreated:newdata:A40 30000C0CFA8B29444D30100 000000 |

-continued

| Sandbox event name | Event data used | Field name in dynamic | Example |
|---|---|---|---|
| | | | keyvaluecreated:newdata:C:\ Windows\1092348421183343 8\winfunx.exe |
| keyValueModified | Modified registry key path, name and newdata | keyvaluemodified: path: | keyvaluemodified:path:HKEY_ USERS\Software\Microsoft\ Office\12.0\Common\ ReviewCycl e |
| | | keyvaluemodified: name: | keyvaluemodified:name:Revie wToken |
| | | keyvaluemodified: newdata: | Modified data added to registry key. Data can be ASCII and binary (represented as hex string) keyvaluemodified:newdata:W HTMLControlEvents keyvaluemodified:newdata:0F 00000001000000140000007175753454C2982E84ED48F5B 4EE5248 |
| memWritten, memAlloc, memProtect, memdumps | Details of memory area modified in the all monitored processes. | memwritten:value: | Memory data written/modified or extracted PE file content - hex string - memwritten:value:4D5A9000 300000004000000FFFF000B8 |
| | | memwritten:valuele n: | Total length of memory memwritten:valuelen:4045 |
| | | memwritten:valuele nA: | Length of data written memwritten:valuelenA:400 |

Dynamic Data

Dynamic data is a collection or dump of all the data received from events, such as those mentioned in Table 1. For most of the events—(staticOLEEntry, HTTP, HTTPS, HTTP data, keyValueCreated, keyValueModified, memWritten, memAlloc, memProtect, memdumps) data is normalized/pre-processed before storing it in a dynamic data buffer.

The collected data can be stored in a special format. Different field names (derived from sandbox event names and value field names) cane used to represent event data, for example—staticgen:filetype:, sigid: etc. This helps in writing a YARA rule on the exact event data and to avoid False Positives. For example, the following YARA rule triggers if string "windows" is found in mutex (mutual exclusion) data only. Without "mutantcreated:name:" field, it could cause FP since "windows" string can be found in data of other events as well.

```
rule Win32_Testing_Rule1 : knownmalwareDS
{
strings:
$str1="mutantcreated:nam
e:windows" condition:
all of them
}
```

Unpacked PE File Extraction

Dynamic data also includes the content of unpacked PE files. Unpacked PE file data can be provided in a memwritten:value: field. This event also provides data written to other processes, such as using a Windows API—WriteProcessMemory and NtWriteProcessMemory. A PE file extraction method can extract an unpacked PE file for malware using remote process injection, process hollowing, or self-injection unpacking methods.

For extracting unpacked PE files from malware that uses process injection or process hollowing techniques, the Dynamic YARA engine uses the "memWritten" event of the sandbox 180. This event provides data written to any process memory. The Dynamic YARA engine only extracts memory data that has been written on other process memory area using WriteProcessMemory and NtWriteProcessMemory Windows APIs. If MZ string is found, full memory data will be added to dynamic data, else only first 746 bytes will be added. As is known in the art, an MZ string is an indication of an executable file in Windows.

For extracting unpacking files from memory dumps and self-injection unpacking, the Dynamic YARA engine can listen for "memAlloc," "memProtect," and "memdumps" sandbox events. "memAlloc" and "memProtect" events provide details about virtual memory modifications done by malware during execution in the sandbox 180 and "memdumps" provide memory dump files.

The following method can be used to extract an unpacked PE file:

1) Store virtual memory base address and length if virtual memory is allocated or virtual memory protection is changed using "VirtualAlloc," "VirtualProtect," "NtAllocateVirtualMemory," "NtProtectVirtualMemory." Windows APIs, respectively.

2) For each virtual memory base address, locate the corresponding memory dump file.

3) For each memory dump file found in step 2), read the first two bytes from offset zero and match with the "MZ" marker.

4) If the "MZ" marker found extract PE file using base address and length values collected in step 1).

To avoid duplication, the MD5 of all extracted PE files is stored and compared to determine if the PE file has been analyzed already.

Dynamic Data File and YARA Scanning

The dynamic data is stored in a file for scanning. The location of the dynamic data file is mentioned in a config.properties file (Table 2). In an embodiment, the maximum size limit for the dynamic data file is 100 MB.

The dynamic data file is scanned using a YARA command-line tool. For example, here is a syntax of the command— yara -f -g -s <dynamic_rule_file> <dynamic_data_file>

Dynamic YARA Configuration Options

The following new configuration options are added for the Dynamic YARA engine. These config options are defined in config.properties file.

TABLE 2

| Dynamic yara engine config options | | |
|---|---|---|
| Config option | Default value | Comment |
| MAX_ZSYARABUFFERSIZEINMB | 100 MB | Max dynamic YARA data |
| MAX_ZSYARAPEDUMPSIZEINMB | 100 MB | Max memdump file size. |
| MAX_ZSYARAMEMWRITTENDUMPSIZEINMB | 100 MB | Max extracted PE file size. |
| ZSYARARULEPATH | — | Dynamic YARA rules file. |
| ZSYARADATAFOLDER | — | Dynamic YARA data file location. |
| ZSYARADEBUG | — | Debug flag, True to disable deletion of dynamic YARA data file. |

Dynamic YARA Python signature

A new Python signature is used in the Dynamic YARA approach. This new signature can merge Known Clean File detection and Known Malicious File detection Python signatures.

Figures 9, 10:
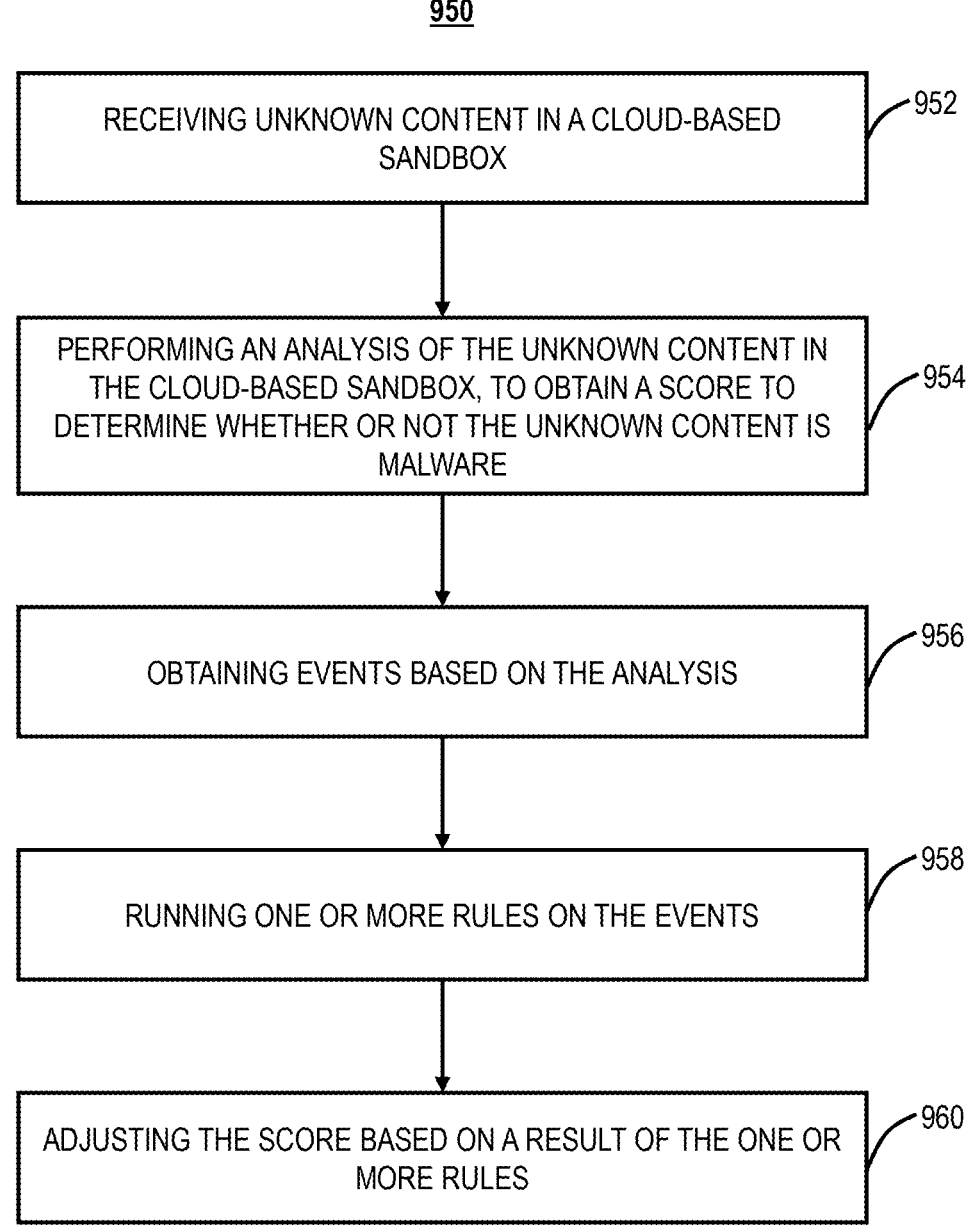
FIG. 9 is a screenshot of a Dynamic YARA rule name and contextual information in a BA report.
FIG. 10 is a flowchart of a process for dynamic rules in a cloud-based sandbox.

This new Python signature listens for "zsyarahit" and "sights" events. "zsyarahit" provides details of dynamic YARA rules that hit on the dynamic data file. This signature decides about the dynamic YARA rule score based on the rule tag (discussed in the following section). It also collects contextual information about YARA rule hits. This information is shown in a BA UI report along with dynamic YARA rule names (FIG. 9). The maximum limit for contextual information can be 250 characters.

Dynamic YARA Rules

The Dynamic YARA rules can be ordinary YARA rules. A new YARA file—dynamic_ba_yara.yara—can hold the YARA rules.

The Dynamic YARA rules can use specific tag names. These tags control the type and score of the rule. There can be two types of dynamic YARA tags—knownclean and knowmalware, each with a specific score A knownclean tag is used for clean samples; it marks any sample as clean, regardless of the DA score. This can be done using special score "-127".

Here is an example YARA rule for knownclean:

```
rule Gen_Installer : knownclean
{
    strings:
        $sig_id="sigid:11004"//Known malicious MD5
        $dropped_file_count="filedump:path:"
        $pattern=/window:title:.{0,100}(setup|install|wizard).{0,100}\nwindo
        w:text:.
        {0,1000}(next|back|close|exit|decline|accept|cancel)/ nocase
    condition:
        #dropped_file_count>3 and $pattern and not $sig_id
}
``` knownmalware tag have the following sub-tags, all these tags are used to detect malware. These tags also specify the score for the rule (Table 3).

TABLE 3

| Dynamic YARA rule tags, order by priority | | |
|---|---|---|
| Priority | Tag name | Score |
| 1 | knownclean | −127 |
| 2 | knownmalwareDS | Dynamic score |

TABLE 3-continued

| Dynamic YARA rule tags, order by priority | | |
|---|---|---|
| Priority | Tag name | Score |
| 3 | knownmalware | 127 |
| 4 | knownmalware40 | 40 |
| 5 | knownmalware20 | 20 |
| 6 | knownmalware10 | 10 |
| 7 | knownmalware0 | 0 |

The knownmalware tag is to mark any sample as malware (using special score 127) regardless of the DA score. Since there are more granular scoring tags, knownmalware tag is generally not used. All the other knownmalware tags add 40, 20, 10, or 0 scores to a DA score. In case of multiple dynamic YARA hits, priority mentioned in Table 3 is used, and the final score is added to DA.

The knownmalwareDS tag is a special tag that is used for dynamic scoring. This is used when there is a desire to adjust the score of a YARA rule automatically based on the DA score. The Dynamic YARA rule using this tag will always mark the sample as malware but add only the required score to DA. It can use the following method to decide the score (Table 4)—

TABLE 4

| Dynamic score mapping | |
|---|---|
| DA Score | YARA rule |
| 120 and above | 0 |
| 100-110 | 10 |
| 80-90 | 20 |
| 50-70 | 40 |
| 40 and less | 127 |

So, this helps in using the same dynamic YARA rule for attribution and detection. The knownmalwareDS tag is very useful for malware those anti-sandbox techniques or any downloader that was not able to download the payload.

Dynamic YARA Process

FIG. 10 is a flowchart of a process 950 for dynamic rules in a cloud-based sandbox. The process 950 can be a computer-implemented method, embodied as instructions in a non-transitory computer-readable medium, implemented via the server 200, via the sandbox 180, and the like. In an embodiment, the process 950 can be implemented in a cloud-based sandbox that is located inline between devices associated with unknown content.

The process 950 includes receiving unknown content in a cloud-based sandbox (step 952); performing an analysis of the unknown content in the cloud-based sandbox, to obtain a score to determine whether or not the unknown content is malware (step 954), and allowing the unknown content from the cloud-based sandbox responsive to a determination of the analysis that the unknown content is not malware; responsive to the determination of the analysis that the unknown content is malware, obtaining events based on the analysis (step 956); running one or more rules on the events (step 958); and adjusting the score based on a result of the one or more rules, classifying the unknown content as malware or clean based on the adjusted score, and allowing or blocking the unknown content based on the classifying (step 960). The process 950 can further include classifying the unknown content as malware or clean based on the adjusted score.

The analysis can include a static analysis and a dynamic analysis. The events are generated during the static analysis and the dynamic analysis. The events can include any of file extension, signature hits, paths, title and text of windows created, DNS query names, processes created, memory information, mutex names, HTTP data, and registry information. The events can be processed and stored in a dynamic data buffer in a specific format, for processing by the one or more rules. The events can include content of unpacked files determined to be executable files. The adjusting can include a dynamic score for the one or more rules based on the score from the analysis.

Exploit Detection in Cloud Sandbox

The present disclosure provides exploit detection in cloud-based sandboxes. Various embodiments include processing additional sandbox event data in the dynamic data buffer (i.e., the dynamic YARA engine), the additional data being in adjunct to the previously described data. The various additional dynamic data can include the examples listed in Table 5.

The additional data includes API chain (chainfunc) data added to the dynamic data. API chain event data provides information about different behavior of samples in addition to providing the Windows API name which is responsible for the behavior. Various data fields used for API chain events are listed below.

Func—name of the sandbox event

Symbol—Windows API name

Currentpath—path of the current process

Chainfunc;apicalls—counter for API call and dynamic data field name

An API count threshold flag specifies a maximum number of API calls to be listed in the dynamic buffer. A default threshold (i.e., 10) can be utilized as well as any preconfigured threshold. An example of an output format is shown below.

<process_path>:<process_name>:<process_counter>: chainfunc:apiCalls:<Sandbox_Event_Name>:<API_counter>:<API_Name>(API_DATA).

Similarly, a final output can be structured as follows.

C:\\Windows\System32\conhost.exe:conhost.exe:1: chainfunc:apiCalls:section Loaded:1:LoadLibraryW (path=\KnownDlls\user32.dll).

Along with the described additional data, configuration data for API chains is also contemplated. An event in the sandbox can provide various information regarding behaviors of a sample. With this said, it is not possible to include all of the information in the dynamic data that an event provides. Thus, a configuration data file is utilized. The configuration data file describes data from which fields are required. For example, configuration data can start as DYNAMIC_YARA_CONFIG_APICHAIN_DATA, and end with END_DYNAMIC_YARA_CONFIG_API-CHAIN_DATA.

Configuration files can be in JSON format, where one can specify an event name or API name along with the various sandbox event fields to obtain the specified data. Such configuration data can be a part of the previously described dynamic_ba_yara.yara file, and is added as a comment in the yara file. An example of configuration data is shown below.

```
[DYNAMIC_YARA_CONFIG_APICHAIN_DATA]
libsConfigData={
'VirtualAllocEx':['path','protect','status'],
'VirtualProtect':['path','base','length','newprotect','oldprotect','status'],
'objectSet':['path','infoclass'],
'processQueried':['path','class'],
```

| Sandbox event name | Event data used | Field name in dynamic data | Example |
|---|---|---|---|
| chainfunc | List of all windows API's queried by processes | chainfunc:apicalls | chainfunc:apiCalls:threadDelayed: |
| fileopened | path of all opened files | fileopened:path: | fileopened:path:C:\Windows\AppPatch\sysmain.sdb |

-continued

```
'LoadLibrary':['path'],
}
[END_DYNAMIC_YARA_CONFIG_APICHAIN_DATA]
```

An example of a dynamic yara rule for detecting a potential exploit sample is shown below.

```
rule Win32__GenExploit: knownmalwareDS
{
strings:
$filetype="staticgen:filetype:exe"
$ntkrnlmp1=/chainfunc:apiCalls:sectionLoaded.{10,100}\(path=.{10,256}(ntkrnlm
p.exe|ntoskrnl.exe)/
$ntkrnlmp2="memstring:string:ntkrnlmp.exe"
$queryDriverList="sigid:209" fullword
condition:
$filetype and ($ntkrnlmp1 or $ntkrnlmp2) and $queryDriverList
}
```

A rule, such as the rule depicted above, checks for filetype first, and checks if any of the processes have called Load-Library API with a parameter containing a string ntkrnlmp.exe or ntoskrnl.exe.

The present disclosure proposes including fileopened event data (DLL load data) to the dynamic event data. Such event data provides information about files opened by the target process. This information can be used to detect exploit code that uses specific Dynamic Link Library (DLL) APIs. A path data field and a symbol data field from the sandbox event fileopened are used to track a DLL loaded by the target process. An output can be <process_path>:<API Name>: <event_Name><file_path>.

Exploit Detection Process

Figure 11:
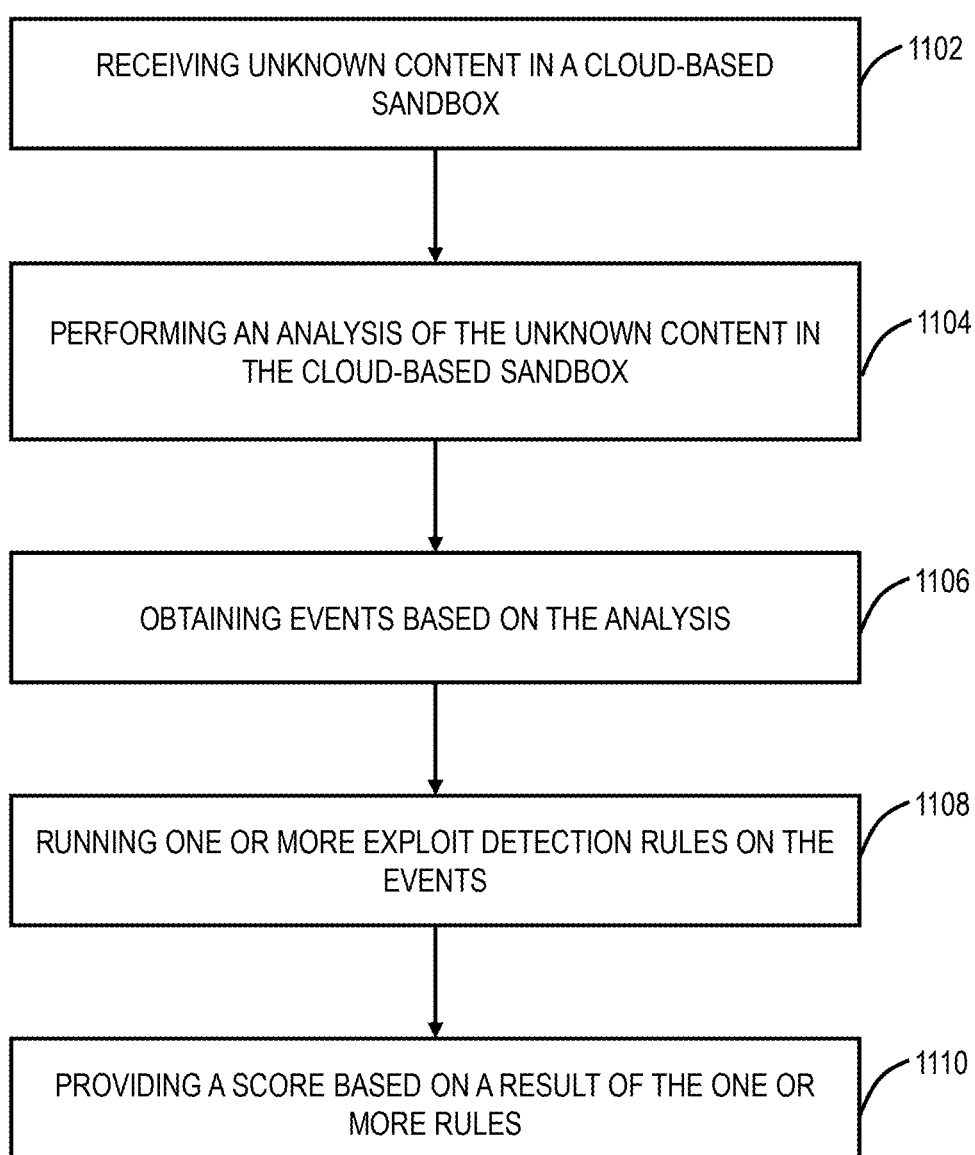
FIG. 11 is a flowchart of a process for exploit detection in a cloud-based sandbox.

FIG. 11 is a flowchart of a process 1100 for exploit detection in a cloud-based sandbox. The process 1100 can be a computer-implemented method, embodied as instructions in a non-transitory computer-readable medium, and implemented via the server 200. The process 1100 includes receiving unknown content in a cloud-based sandbox (step 1102); performing an analysis of the unknown content in the cloud-based sandbox (step 1104); obtaining events based on the analysis (step 1106); running one or more exploit detection rules on the events (step 1108); and providing a score based on a result of the one or more rules (step 1110).

The process 1100 can further include classifying the unknown content as malware or clean based on the score. The events include data containing lists of all queried windows and paths of all opened files. The events include an Application Programing Interface (API) count threshold flag to specify a maximum number of API calls to be listed. The steps can further include specifying an event name or API name along with one or more event fields to obtain specified data. The exploit detection rules can include checking for a file type, and if any processes have called an API with a parameter containing a specified string. The events can include data which provides information about files opened by a target process.

It will be appreciated that the present exploit detection process 1100 can be performed in conjunction with, or as an addition to, any of the disclosed processes herein.

Sandbox

As described herein, the sandbox 180 is configured to analyze content (executables, binaries, documents, etc.) via various techniques to determine how to classify the content, i.e., malicious or benign. The sandbox analysis can include a static analysis and a dynamic analysis, with the events generated based thereon. The sandbox 180 provides an additional layer of security against zero-day threats and Advanced Persistent Threats (APTs) through the analysis, an integrated file behavioral analysis. To ensure security, the sandbox 180 runs and analyzes files in a virtual environment, i.e., isolated environment, to detect malicious behavior. For use in the cloud-based system 100, the sandbox 180 can propagate a hash of malicious files to all nodes 150 throughout the cloud-based system 100, effectively maintaining a real time denylist so it can prevent users 102 anywhere in the world from downloading malicious files. Additionally, it is possible to use artificial intelligence (AI) analysis in the rules to instantly determine the likelihood of a file being benign or suspicious, see, e.g., U.S. patent application Ser. No. 16/902,759, filed Jun. 16, 2020, and entitled "Utilizing Machine Learning for smart quarantining of potentially malicious files," the contents of which are incorporated by reference in their entirety.

Sandbox provides the following benefits:

(1) Analyze unknown files in a virtual environment to detect malicious behavior.

(2) Hash propagation of malicious files across the cloud-based system 100 to protect users 102 anywhere in the world from downloading malicious files.

(3) Use AI tools to provide real-time analysis of unknown files.

The sandbox 180 analyzes executable files and library files (such as dynamic-link libraries) and downloaded from URLs in suspicious URL categories. The suspicious URL categories can include the following Nudity, Pornography, Anonymizer, FileHost, Shareware Download, Web Host, Miscellaneous or Unknown, and the like. The sandbox 180 can analyze compressed or archived files.

When users attempt to download files that meet the above criteria and the cloud-based system 100 has never seen the files before, the sandbox 180 can allow or block the downloads and sends the files to the Sandbox engine for analysis. The sandbox 180 can cause a block of files that contain the following types of malicious files:

(1) Adware: Files that automatically render advertisements/install adware. Often, these advertisements are unwanted and can lead to spyware or other grayware-oriented privacy violations.

(2) Malware and Botnets: Files that behave like APTs, exploits, botnets, trojans, keyloggers, spyware, and other malware. This is a catchall category for any malicious file that does not fall under the other sandbox categories. Most sandbox-classified files are not clearly known to be a specific threat or malware family-oriented because there are not specific signatures or indicators to categorize the file. Instead the sandbox 180 can categorize the file based on an aggregation of the file's OS and application behaviors and network activity.

(3) Peer-to-Peer (P2P) and Anonymizers: Files that exhibit behaviors consistent with P2P/anonymizer programs, such as Tor Browser or other VPN services, that essentially make a user's internet activity untraceable.

The sandbox 180 can block malicious file downloads from any of the following protocols:

(1) FTP over HTTP: File downloads from FTP over HTTP websites.

(2) HTTP: File downloads from HTTP websites.

(3) HTTPS: File downloads from HTTP websites encrypted by TLS/SSL.

(4) Native FTP: File downloads from native FTP servers.

In an embodiment, the sandbox 180 can analyze archived files (e.g., ZIP, TAR, RAR, etc.), executable files (scripts, libraries, etc.), documents (word processing, spreadsheets, PDF, presentations, etc.), mobile applications, Web content (Flash, Java, etc.), and the like.

Obfuscated/Packed Malware

However, threat actors, i.e., authors of malicious content, are evolving their techniques to avoid detection via so-called anti-sandbox techniques to avoid or evade proper classification by the sandbox 180. Generally, these anti-sandbox techniques look at how the sandbox 180 operates and designing malicious content to trick the sandbox 180 into a wrong classification. On such technique is obfuscation or packing malicious code into content. This enables a so-called time delay where the malicious code is not executed up front, but on a delay. As such, during an initial execution in the sandbox 180, malicious content can look benign, evade proper classification, be passed on to the user 102, and later unpack the malicious code for the malicious activity.

Figure 12:
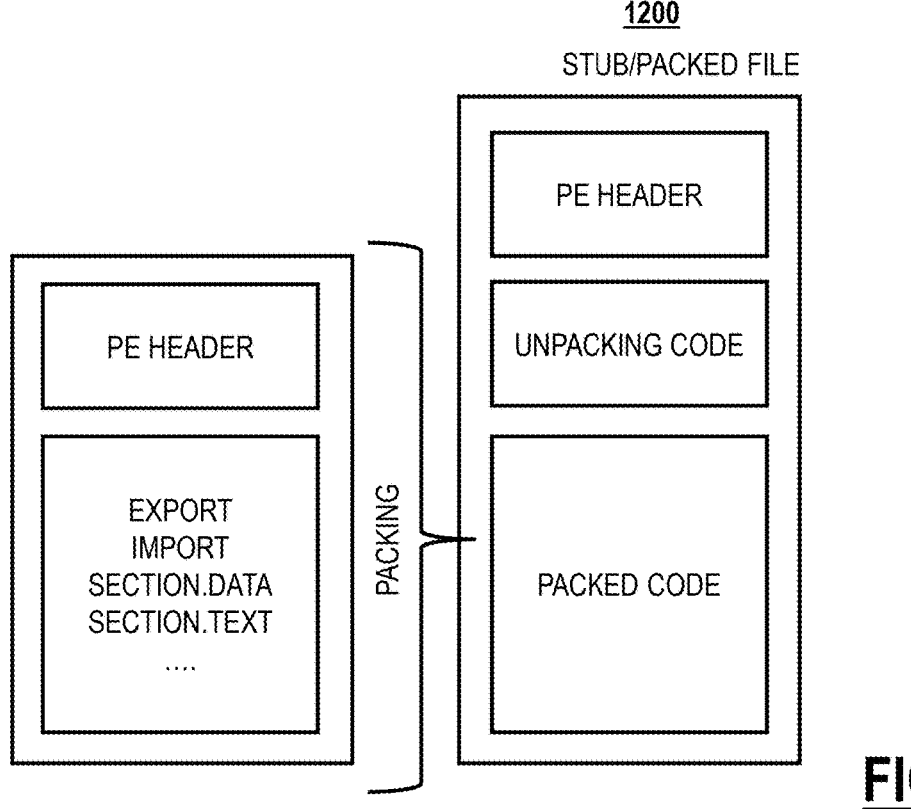
FIG. 12 is a diagram of a packed file with packed code therein.
Figure 13:
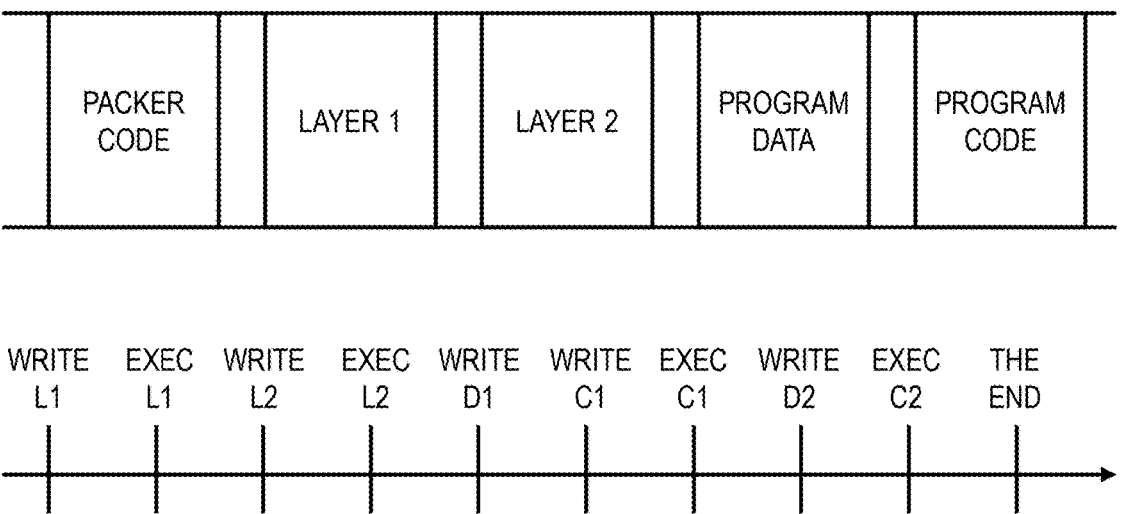
FIG. 13 is a diagram of a timeline of execution of the packed file.

FIG. 12 is a diagram of a packed file 1200 with packed code therein. FIG. 13 is a diagram of a timeline of execution of the packed file 1200. This provides an example of packing or obfuscation. The packed file 1200 can include a Portable Executable (PE) header, unpacking code, and the packed code. The packed code also includes a PE header and associated code. Upon initial execution, the packed file 1200 does not unpack the packed code, to evade sandbox classification. The packed file 1200 can initially only write and execute top layers of code which appear benign to the sandbox 180, and later unpack the packed code for any future malicious intent once the sandbox 180 has been evaded.

With evolving techniques by threat actors, there is a requirement for countless numbers of signatures and an ever-growing signature set, as well as effort in studying and developing unpackers, decryptors, emulators. Even minute changes in the obfuscating software at times render the entire effort ineffective. Further, creating a new detection signature for each variant of a malware (which fails to work on any minor changes at malware side) is passive/reactive approach and time-consuming process.

In-Memory Malware Unpacking/Deobfuscator Scanner

To detect such techniques, the present disclosure includes systems and methods for in-memory malware unpacking and deobfuscation in the sandbox 180. Specifically, the present includes an disclosure in-memory malware unpacking/deobfuscator scanner ("scanner") that can be used in the sandbox 180. The scanner solves the aforementioned problems by handling evasive malwares and creating detection based on Tactics, Techniques, and Procedures (TTP) at the core of malware. This allows covering entire categories of malicious software with few signatures. Rather than characterizing and searching for tools and artifacts, a more robust approach is to characterize and search for the techniques adversaries must use to achieve their goals. These techniques do not change frequently, and are common across adversaries due to the constraints of the target technology.

Conventional detection technologies based on various approaches include pattern matching, static unpacker/de-obfuscator with pattern matching capabilities, engines with emulation support, behavior and ML based detection. However, such approaches do not provide an end-to-end generic unpacking/de-obfuscator with detection capabilities. The conventional static unpackers are specific in nature which tend to break even with minor modifications. The conventional dynamic unpackers have limitations. For example, the ones based on control transfer fail with self-modifying code, remote code injection, event driven execution, etc. Behavior based detection technologies success lies in exhibition of the behavior which is exposed upon successful execution, and can be evaded. Continuous learning has a higher rate of false positive and false negative.

The sandbox 180 supports:

(1) generic identification of malware, (2) runs scans on the core of content, (3) evades anti-debug techniques, (4) include TTP for detection, (5) supports Dynamic rules, e.g., Yara, and (6) includes collection of various logs.

Figure 14:
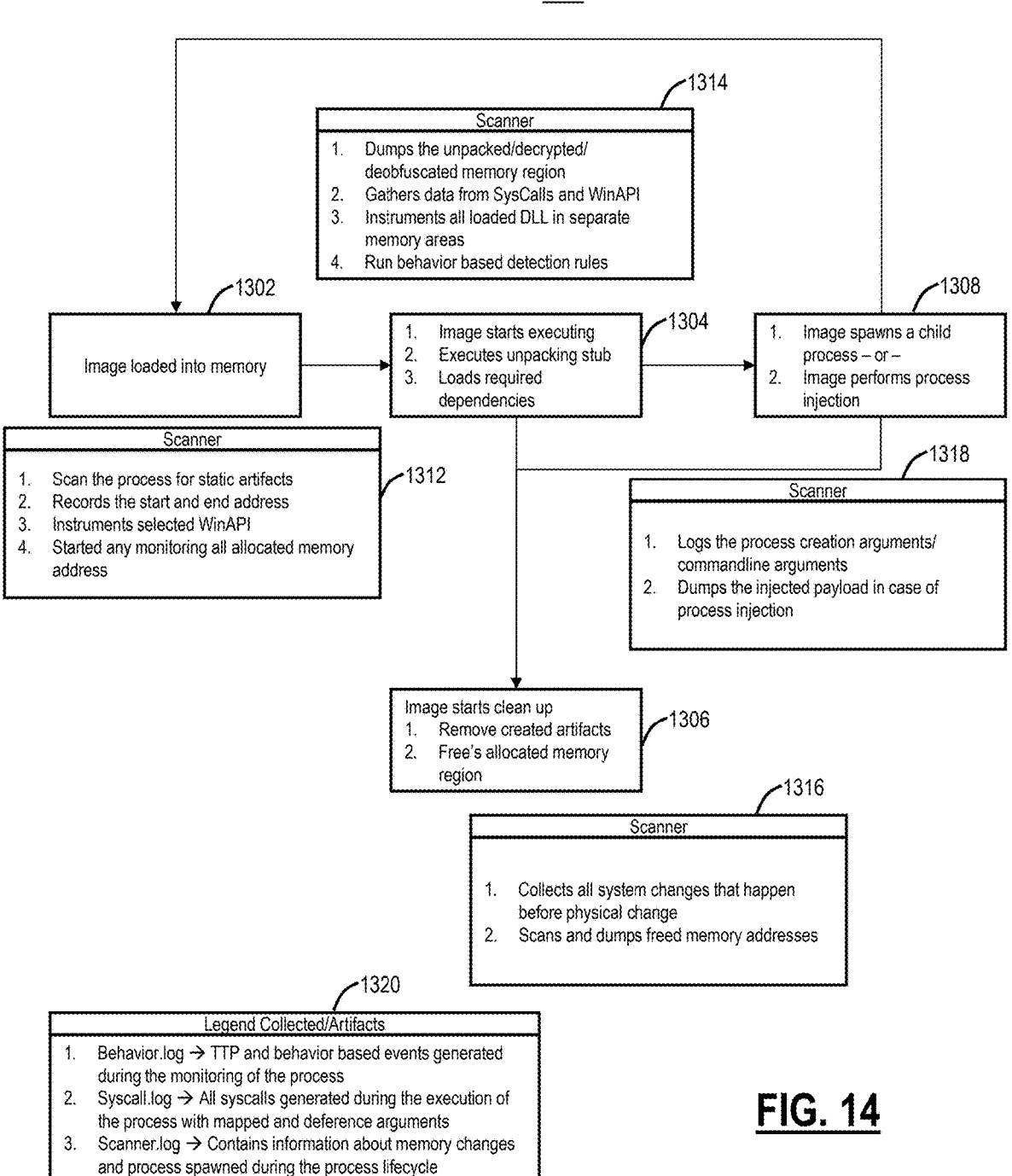
FIG. 14 is a flow diagram of a runtime execution process of a scanner.

FIG. 14 is a flow diagram of a runtime execution process 1300 of a scanner. The scanner is a component of the sandbox 180 meant to address packing and obfuscation in content. The scanner is referred to as an in-memory malware unpacking/deobfuscator scanner. The scanner can be embodied as a method having steps, implemented via a server or node 150 configured to execute the steps, and as instructions stored in a non-transitory computer-readable medium storing instructions for programming one or more processors to execute the steps. For illustration purposes, the process 1300 is described with reference to the Windows operating system, and those skilled in the art will recognize similar approaches are contemplated with other operating systems, e.g., Linux, IOS, Android, MacOS, and the like.

Of note, the process 1300 is performed in the sandbox 180 subsequent to scanning the image of the content to detect packed, obfuscated, or encrypted content. The scanner performing the process 1300 includes various unpackers, deobfuscators, and decryptors, each configured to obtain the packed code and execute it for analysis thereof. The process 1300 describes the runtime execution process of the so-called packed code.

FIG. 14 describes the runtime execution process 1300 with steps 1302-1308, 1312-1320, where the steps 1302-1308 describe activity of content in memory and the steps 1312-1320 correspond to corresponding activity of the scanner monitoring the content's activity in memory. The runtime execution process 1300 is implemented as part of the sandbox 180 operation, after receiving content for classification. First, at step 1302, an image of the content is loaded in memory.

At step 1312, corresponding to the step 1302, The scanner is configured to scan processes associated with the content for static artifacts. As is known in the art, an artifact is a byproduct of operation of software, and a static artifact is one detected based on loading the image in memory. The static artifacts can be based on the static analysis described herein. The scanner records the memory addresses of the image, e.g., start and end addresses. The scanner determines if the image instruments any Application Programming Interfaces (APIs), e.g., WinAPI. Finally, the scanner starts monitoring all allocated memory addresses.

At step 1304, the image starts executing, including executing an unpacking stub, and loading required dependencies. At step 1314, the scanner dumps the unpacked/decrypted/deobfuscated memory region, gathers data from system calls and APIs, instruments all loaded dynamic link libraries (DLLs) in separate memory areas, and scans with privy threat detection rules. As described herein, "privy" means some rules implemented based on the knowledge of malware, threat actors, evasion techniques, TTP, etc. These detection rules are not merely behavior based rules.

After step 1304, the image can either start cleaning up (step 1306) or continue (step 1308). At step 1306, the image starts to clean up, removing created artifacts and freeing up allocated memory regions. At step 1316, corresponding to step 1306, the scanner is configured to collect all system changes that happen, before any physical change, and scans and dumps freed memory addresses.

At step 1308, the image can either spawn a child process or perform process injection. At step 1318, corresponding to step 1308, the scanner is configured to log the process creation arguments and command line arguments, and/or dump the injected payload in case of process injection.

Throughout the steps 1312-1318, the scanner is configured to collect various artifacts and other information in various logs, step 1320. The logs can include a behavior log where TTP and behavior based events generated during monitoring of the process are collected, a system call log where all system calls generated during execution of the process are collected with mapped and deference arguments, and a scanner log which collects all information and memory changes and processes spawned during the process lifecycle.

In-Memory Malware Unpacking/Deobfuscator Scanner Process

FIG. 15 is a flowchart of an in-memory malware unpacking/deobfuscator scanner process 1400. The process 1400 can be a computer-implemented method, embodied as instructions in a non-transitory computer-readable medium, implemented via the server 200, via the sandbox 180, and the like. In an embodiment, the process 1400 can be implemented in a cloud-based sandbox that is located inline between devices associated with unknown content. Also, the process 1400 contemplates operation with and/or use of any of the techniques and other processes described herein. That is, the process 1400 can be utilized with any sandbox analysis technique, to enhance the classification capabilities to defeat packing and obfuscation.

The process 1400 includes, responsive to receiving unknown content, scanning an image of the unknown content for packed, obfuscated, or encrypted code (step 1402), responsive to detecting the packed, obfuscated, or encrypted code (step 1404), performing steps of unpacking, deobfuscating, or decrypting the packed, obfuscated, or encrypted code (step 1406); executing the unpacked, deobfuscated, or decrypted code (step 1408); monitoring execution of the unpacked, deobfuscated, or decrypted code (step 1410); obtaining events during the scanning and the execution (step 1412); and providing the obtained events to the sandbox for use in a sandbox analysis for classifying the content as one of malware and clean (step 1414).

The process 1400 can include, responsive to not detecting the packed, obfuscated, or encrypted code (step 1404), performing the sandbox analysis. The unpacked, deobfuscated, or decrypted code is configured to execute on a time delay to avoid the classifying by the sandbox. The monitoring can include detecting any spawned child processes and the events include associated arguments. The monitoring can include detecting any process injection and the events include a dump of associated payloads. The monitoring can include detecting any system calls and Application Programming Interface (API) calls.

The events can include a plurality of behavior based events, system calls, and memory events. The events can include Tactics, Techniques, and Procedures (TTP) events and behavior events. The process 1400 can further include running one or more rules on the events; and providing results of the one or more rules to the sandbox. The process 1400 can further include, subsequent to the sandbox analysis and obtaining a score of the content based thereon, adjusting the score based on the obtained events from the execution of the unpacked, deobfuscated, or decrypted code.

The process 1400 includes parsing the image for executable sections, which can be packed, obfuscated, or encrypted, and instrumenting the associated code. During the monitoring, the process 1400 includes monitoring all memory allocations and permission changes, monitoring for write or execution rules, and scanning the memory when there are any violations. The monitoring in the process 1400 can be until the process terminates or for a given amount of time, which can be configurable.

The objective of the process 1400 is to obtain additional information that can be used in scoring during the sandbox analysis, to properly classify the content. In addition to using the events to adjust a sandbox score, the events can be used for threat intelligence, improving Yara signatures, machine learning, and the like. There can be post analysis scripts run of the collected artifacts to detect anomalies and behavior. There can be a heuristics based approach for flagging TTP/Suspicious behavior.

The scanner can include various unpackers, deobfuscators, and decryptors. These are configured to obtain the unpacked, deobfuscated, or decrypted code from the image for execution thereof, i.e., without a time delay. Some examples include:

| UPX | ASPack | ENIGMA Protector | MPRESS |
|---|---|---|---|
| EXE Packer | Morphine | Obsidium | simplepack |
| execryptor | mew | Hidepe | EXEStealth |
| Excalibur | Petite | ZIP | RAR |

Note, we are handling these different unpackers, etc. via a generic algorithm rather than individual scripts.

Scanner System and UI

Figure 16:
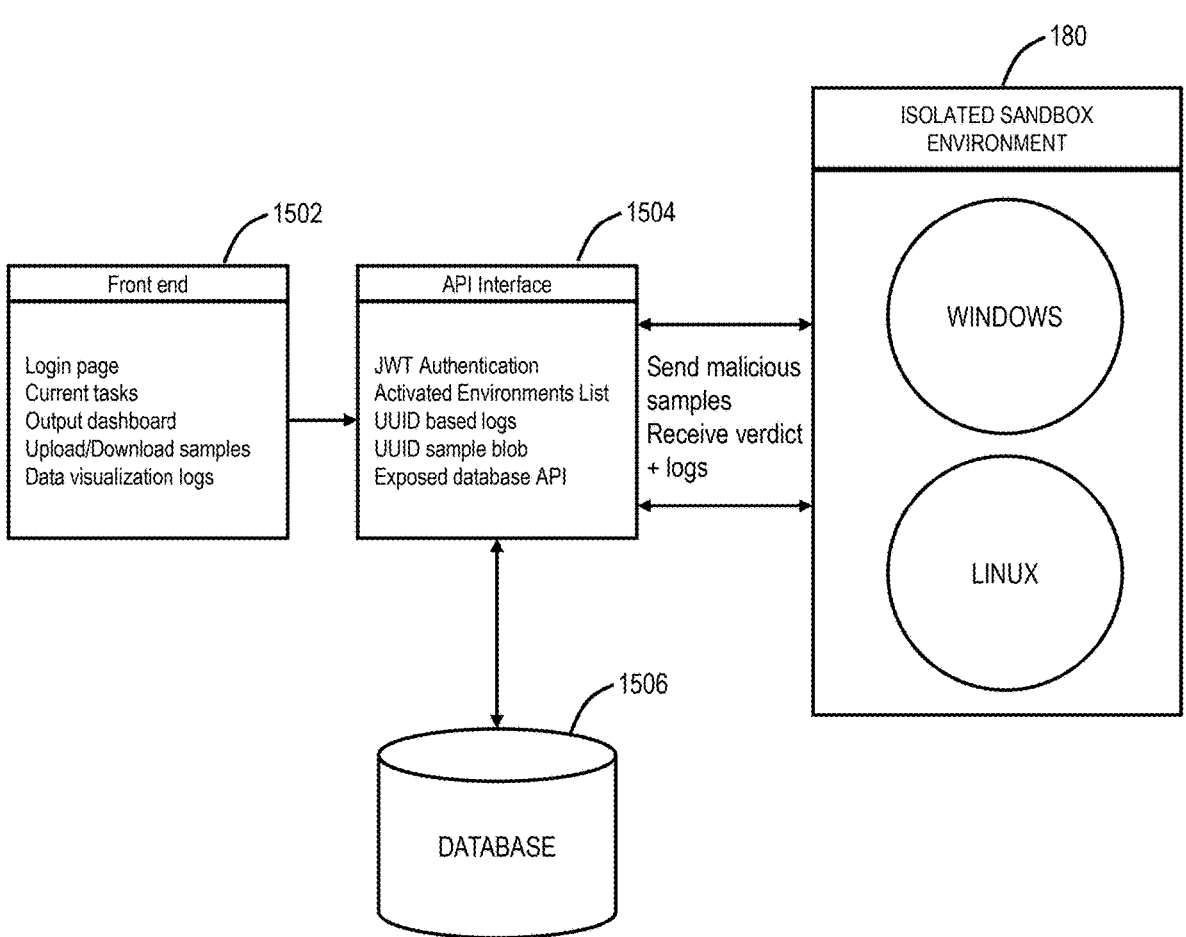
FIG. 16 is a block diagram of a scanner system for implementing the process with the sandbox.

FIG. 16 is a block diagram of a scanner system 1500 for implementing the process 1400 with the sandbox 180. The scanner system 1500 can be integrated within the sandbox 180 or a standalone component. The scanner system 1500 can include a front end 1502, an API interface 1504 to the sandbox 180, and a database 1506. FIG. 17 is a screenshot of a sandbox output based on the process 1400.

Structural Similarity Hash (SSHash)

The present disclosure further provides systems and methods for structural similarity based hash (SSHash) for sample identification and detection. The SSHash methods described herein provide hashing processes which leverage characteristics of data and their distribution density in a file/input buffer. The computed hash reflects both the nature and distribution density in the file/input buffer. Thus, the hash can be leveraged to identify structurally similar files.

The present systems and methods offer a near to real time detection solution. The systems are adapted to identify structurally similar malicious files that use evasive techniques such as polymorphism, obfuscation, use of anti-analysis tricks, etc. to evade detection from traditional/conventional malware detection engines. These methods reduce load on performance intensive detection technologies such as sandboxing, emulation, etc. Characteristically similar non-PE (non portable executable) files can also be identified using the present SSHash systems and methods. Additionally, a major chunk of the file transmission involves clean/legitimate files wherein detection technologies spend a good amount of time looking for either patterns as specified in signatures or executing them under controlled environment to collect behavioral and other artifacts to give verdicts. In various embodiments, the systems and methods can be further utilized to effectively identify structurally similar clean/benign files. Such features can be useful in segmenting, sorting, etc.

A number of traditional detection technologies exist which are based on different approaches. These approaches include cryptographic hash, pattern match, behavioral, memory, filesystem, network artifacts, ML/AI based, etc. Most of these approaches are used for threat detection, though some are also used for clean file detection/grouping. Techniques to identify identical files (based on static file's attributes or content) have also been used, although, these are mostly used for clustering samples, i.e., grouping similar files. Some of these techniques include ssdeep, peHash (only for PE files), vhash, Locality Sensitive Hashing Algorithm (TLSH), etc. Context Triggered Piecewise Hash (CTPH) based tools such as ssdeep and others have been in existence from quite some time. It is observed that ssdeep is prone to content variation thus not very effective. Others are very lenient by design as these are intended to be used for clustering meaning they include/introduce noise. Similarly, behavior based similar file identification technologies are very resource hungry, require sample execution, and rely mostly on exhibition of sample behavior. Many of these hashing algorithms are based on cryptographic hashes which introduce deficiencies when there is an event where a single bit change leads to an entirely new hash being required for the file. Other hashing algorithms are focused on single file types, requiring several different algorithms for processing different file types. Further, these traditional methods introduce noise into the clustering/identification due to loose conditions. Conflictingly, when a method is too tight, i.e., the conditions are too strict, only files which are exactly the same or almost exactly the same will be grouped or identified as being in the same category. This is bad due to similar files being left out due to the strict conditions. This means that a solution which is not too loose or too tight is needed.

Rather than relying on the content (prone to variation) or certain file attributes (loose thus includes noise), the present systems utilize the nature and distribution of data to compute hash. Thus, the present systems can be utilized for identical malware file detection (both PE and non-PE), identical clean file detection (both PE and non-PE), sandbox load reduction, Data Loss Prevention (DLP), sample clustering, threat hunting, detecting polymorphic/metamorphic samples, grouping files, and the like. The present systems and methods are adapted to perform file clustering/grouping, file identification, malware detection, etc. on P files, Portable Executable (PE) files, shortcut (LNK) files, Portable Document Format (PDF) files, Executable Linkable Format (ELF) files, Android Package Kit (APK) files, Hypertext Markup Language (HTML) files, etc. unlike traditional methods which focus on a single file type.

Figure 18:
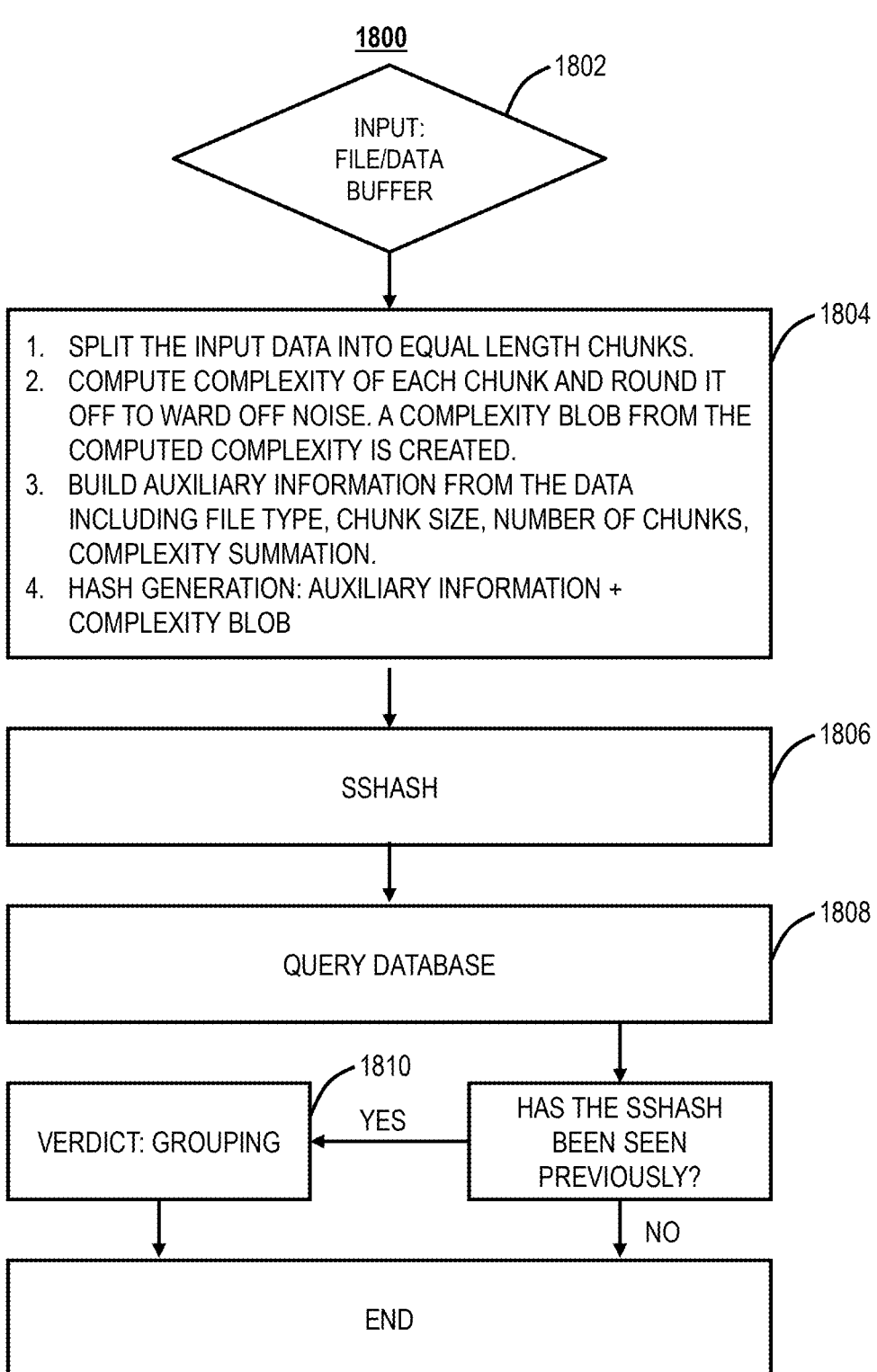
FIG. 18 is a flow diagram of the present Structural Similarity based Hash (SSHash) methods.

Again, the present SSHash is a hashing method that leverages the characteristics of data and its distribution density in a file/input buffer. The computed hash reflects both the nature and distribution density in the file/input buffer thus it can be leveraged to identify structurally similar files. FIG. 18 is a flow diagram of an embodiment of the present Structural Similarity based Hash (SSHash) methods. The process 1800 presented in FIG. 18 includes receiving a file/data buffer (step 1802), which can be input into the system in real time as traffic/data traverses the cloud-based system 100 or in response to security systems identifying traffic as being suspicious. Further, the present processes can be utilized to act as the first line of defense. That is, the present SSHash methods can act as the system that, as described herein, determine unknown content from a user of one or more users as belonging to one or more specific groups. When a file/data buffer is given as an input, i.e., the systems identify a file/data buffer, the systems process the file (step 1804). This processing includes splitting the input data into equal length chunks. Then, the systems compute the complexity of each chunk and round it off to ward off noise. This complexity, in various embodiments, is based on Kolmogorov complexity calculations. Auxiliary information is then built from, and enriched with the data such as file type, chunk size, number of chunks, complexity summation, etc. After computing the auxiliary information, a hash is generated (step 1806) from the auxiliary information and the complexity information. A database can then be queried (step 1808) to determine if a similar file has been seen in the past. This can include determining, via the database if a similar file has been seen in the past (step 1810), which group the file in question belongs to. The database can include whether the files therein are malicious or benign, thus allowing the systems to determine if a similar file is malicious or benign. Additionally, if a similar file does not exist in the database, the systems can employ one or more of the file determination mechanisms described herein for further study. This further study can include sending the sample to a sandbox as described herein.

In various embodiments, a learning process is contemplated for the system. That is, in order to build the database, the systems must populate the database with files of known groupings. In various embodiments, in order to populate the database with samples, files are sent to a sandbox for verdict determination (i.e., determine the grouping of the file). Again, this database can be referenced when making determinations for live traffic. More specifically, the SSHash of a file in the traffic can be processed and the database can be referenced for any similar SSHashes. Based on any similar SSHashes in the database, the systems can make a determination as to what group the file in the traffic belongs to. Again, in some cases, if a file is determined to be unknown by the present systems, the systems can employ any other security system described herein for making a grouping determination.

In various embodiments, in order to build such a database, a first step can include creating a database with appropriate fields which not only give indication of the time a sample was first and last seen, but also some projection as to whether it is inclined towards "known good" or "known bad", status of distribution source whether it is known good, or known bad, and identify conflicting cases/collisions. Building the database can then include populating the database with known clean file data such as PE files shipping with various Microsoft OS builds, applications, commonly used third party applications, etc. The database can then be populated with known malware data (in house sample collection which are properly tagged, threat intelligence portals such as Virus Total, Malware Bazaar, and others of the like) The learning can be a continuous process learning active threats as and when received and further including a feedback mechanism (for conflicting cases).

Encoding of the computed value is done to add obfuscation whilst providing flexibility to perform similarity match along with the exact match. Use of auxiliary information can narrow down the search to the respective table thus making search query faster and lesser prone to false positives. SSHash computation can be kept detached from the file type identification, encoding, and similarity computation logic as it is the primary component, the rest can all be contemplated as supplementing the SSHash computation.

Figure 19:
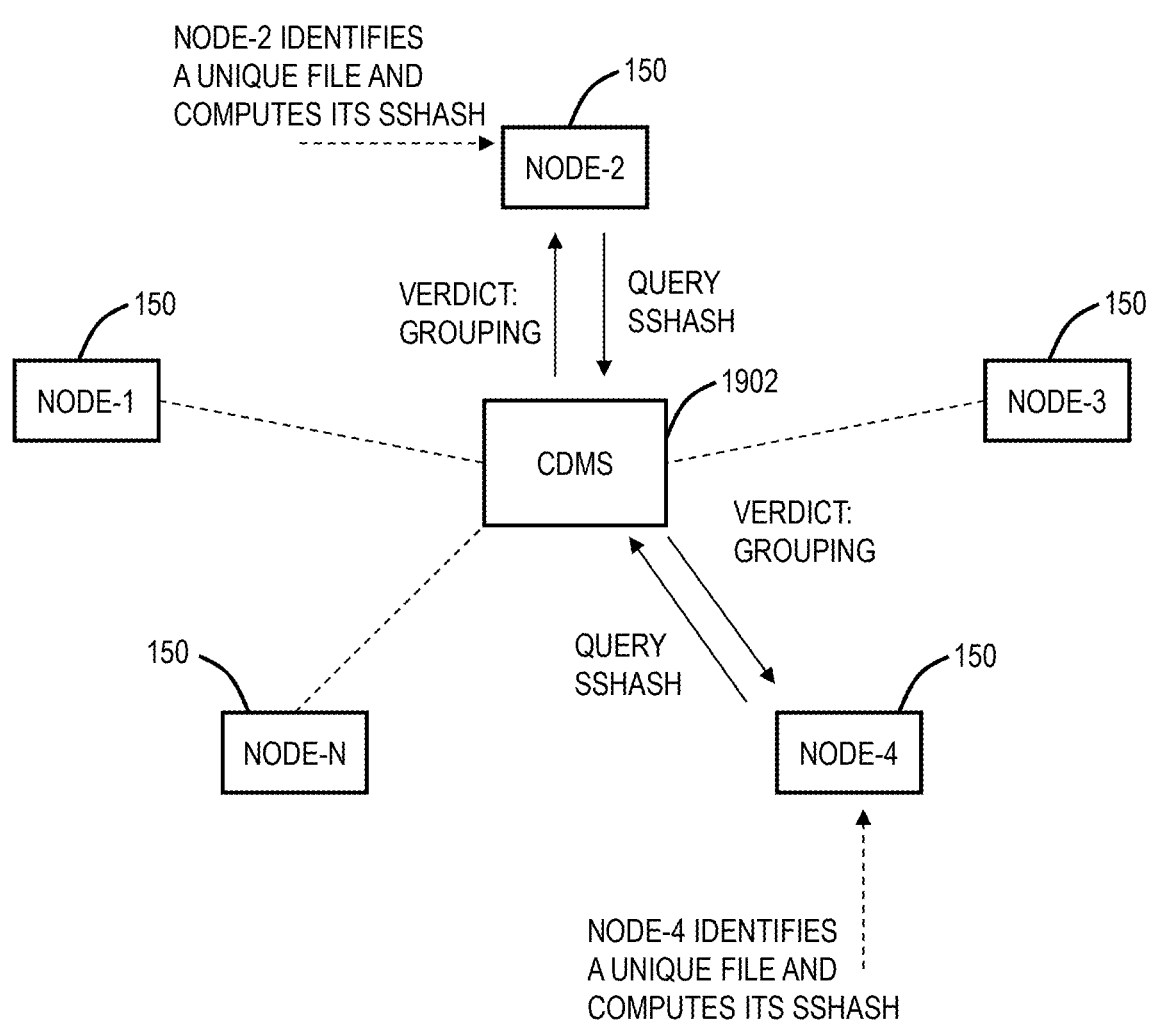
FIG. 19 is a flow diagram of an embodiment of the present SSHash systems deployed within a cloud-based system.

FIG. 19 is a flow diagram of an embodiment of the present SSHash system deployed within a cloud-based system. The present SSHash system can be deployed across a plurality of nodes 150 of the cloud-based system 100. Further, a Central Database Management System (CDMS) 1902 can be deployed within the cloud-based system and adapted to communicate with the various nodes 150. The various nodes 150 are adapted to compute SSHashes for files and via communication with the CDMS 1902, query the database for similar SSHashes in order to identify a verdict for the file in question, the verdict being a grouping for the file in question. The systems can be adapted to compute a SSHash for a file based on the file being unique, i.e., based on the file not being know or seen before by the node 150 or the cloud-based system as a whole.

Process for Sample Identification and Detection Via SSHash

FIG. 20 is a flow chart of a process for sample identification and detection via SSHash. The process 2000 includes monitoring traffic associated with a cloud-based system (step 2002); identifying a unique file within the traffic and computing a Structural Similarity Hash (SSHash) for the file, wherein the SSHash is based on auxiliary information and a complexity of the file (step 2004); identifying one or more similar files based on the SSHash (step 2006); and defining the file as being any one of malware, clean, and unknown based on the one or more similar files (step 2008).

The process 2000 can further include splitting the file into one or more equal length chunks; computing a complexity of each of the one or more equal length chunks; collecting auxiliary information from the file; and generating the SSHash based on the auxiliary information and complexity of the file. Responsive to determining that no similar files exist, the steps can include sending the unique file to a sandbox for analysis. Identifying one or more similar files can include referencing a SSHash database of files known to be one of malicious or clean. The database can be managed and persisted in a Central Database Management System (CDMS) of the cloud-based system. The monitoring and computing can be performed via one or more nodes of the cloud-based system communicatively coupled to the CDMS, wherein the one or more nodes of the cloud-based system are adapted to send query requests to the CDMS for identifying one or more similar files. The steps can further include performing an action based on the defining, wherein the action includes one of blocking the traffic and allowing the traffic. The steps can further include building an SSHash database prior to the monitoring. Building the SSHash database can include sending a plurality of sample files to a sandbox for grouping the plurality of sample files. For example, grouping them as malicious, clean, or unknown in examples where the present systems are used for malware detection. The unique file can be any of a P file, a Portable Executable (PE) file, a shortcut (LNK) file, a Portable Document Format (PDF) file, an Executable Linkable Format (ELF) file, Android Package Kit (APK) file, Hypertext Markup Language (HTML) file.

Conclusion

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming one or more processors to perform steps of:

monitoring traffic associated with a cloud-based system;

identifying a unique file within the traffic and computing a Structural Similarity Hash (SSHash) for the file, wherein computing the SSHash comprises splitting the filed into a plurality of chunks, computing a complexity of each of the plurality of chunks, rounding the computed complexities to reduce noise, collecting auxiliary information including at least a file type, chunk size, and number of chunks, and generating the SSHash based on both (i) the distribution density of the computed complexities across the plurality of chunks and (ii) the auxiliary information;

identifying one or more similar files based on the SSHash by referencing a database of SSHashes, the database being populated through continuous learning including enrichment from sandbox verdicts of unknown files and curated sets of known clean and known malicious files; and defining the file as belonging to one of multiple groups comprising at least malware, clean, or unknown based on the one or more similar files.

2. The non-transitory computer-readable medium of claim 1, wherein computing the SSHash further comprises:

splitting the file into one or more equal length chunks;

computing a complexity of each of the one or more equal length chunks, including determining a Kolmogorov-style complexity measure of each chunk;

rounding the computed complexity values to mitigate noise and calculating a distribution density of the complexity values across the chunks;

collecting auxiliary information from the file; and generating the SSHash based on the auxiliary information and the distribution density of the complexity of the file.

3. The non-transitory computer-readable medium of claim 1, wherein responsive to determining that no similar files exist, sending the unique file to a sandbox for analysis.

4. The non-transitory computer-readable medium of claim 1, wherein identifying one or more similar files includes referencing a SSHash database of files having known groupings.

5. The non-transitory computer-readable medium of claim 4, wherein the database is managed and persisted in a Central Database Management System (CDMS) of the cloud-based system.

6. The non-transitory computer-readable medium of claim 5, wherein the monitoring and computing are performed via one or more nodes of the cloud-based system communicatively coupled to the CDMS, and wherein the one or more nodes of the cloud-based system are adapted to send query requests to the CDMS for identifying one or more similar files.

7. The non-transitory computer-readable medium of claim 1, wherein the steps further comprise:

performing an action based on the defining, wherein the action includes one of blocking the traffic and allowing the traffic.

8. The non-transitory computer-readable medium of claim 1, wherein the steps comprise:

building an SSHash database prior to the monitoring.

9. The non-transitory computer-readable medium of claim 8, wherein building the SSHash database includes sending a plurality of sample files to a sandbox for grouping the plurality of sample files.

10. The non-transitory computer-readable medium of claim 1, wherein the unique file is any of a P file, a Portable Executable (PE) file, a shortcut (LNK) file, a Portable Document Format (PDF) file, an Executable Linkable Format (ELF) file, Android Package Kit (APK) file, Hypertext Markup Language (HTML) file.

11. A method comprising steps of:

monitoring traffic associated with a cloud-based system;

identifying a unique file within the traffic and computing a Structural Similarity Hash (SSHash) for the file, wherein computing the SSHash comprises splitty the file into a plurality of chunks, computing a complexity of each of the plurality of chunks, rounding the computed complexities to reduce noise, collecting auxiliary information including at least a file type, chunk size, and number of chunks, and generating the SSHash based on both (i) the distribution density of the computed complexities across the plurality of chunks and (ii) the auxiliary information;

identifying one or more similar files based on the SSHash by referencing a database of SSHashes, the database being populated through continuous learning including enrichment from sandbox verdicts of unknown files and curated sets of known clean and known malicious files; and defining the file as belonging to one of multiple groups comprising at least malware, clean, or unknown based on the one or more similar files.

12. The method of claim 11, wherein computing the SSHash further comprises:

splitting the file into one or more equal length chunks;

computing a complexity of each of the one or more equal length chunks, including determining a Kolmogorov-style complexity measure of each chunk;

rounding the computed complexity values to mitigate noise and calculating a distribution density of the complexity values across the chunks;

collecting auxiliary information from the file; and generating the SSHash based on the auxiliary information and the distribution density of the complexity of the file.

13. The method of claim 11, wherein responsive to determining that no similar files exist, sending the unique file to a sandbox for analysis.

14. The method of claim 11, wherein identifying one or more similar files includes referencing a SSHash database of files having known groupings.

15. The method of claim 14, wherein the database is managed and persisted in a Central Database Management System (CDMS) of the cloud-based system.

16. The method of claim 15, wherein the monitoring and computing are performed via one or more nodes of the cloud-based system communicatively coupled to the CDMS, and wherein the one or more nodes of the cloud-based system are adapted to send query requests to the CDMS for identifying one or more similar files.

17. The method of claim 11, wherein the steps further comprise:

performing an action based on the defining, wherein the action includes one of blocking the traffic and allowing the traffic.

18. The method of claim 11, wherein the steps comprise:

building an SSHash database prior to the monitoring.

19. The method of claim 18, wherein building the SSHash database includes sending a plurality of sample files to a sandbox for grouping the plurality of sample files.

20. The method of claim 11, wherein the unique file is any of a P file, a Portable Executable (PE) file, a shortcut (LNK) file, a Portable Document Format (PDF) file, an Executable Linkable Format (ELF) file, Android Package Kit (APK) file, Hypertext Markup Language (HTML) file.

* * * * *